US012158884B1

(12) United States Patent
Marchetti et al.

(10) Patent No.: US 12,158,884 B1
(45) Date of Patent: Dec. 3, 2024

(54) EMBEDDED TOKENS FOR SEARCHES IN RENDERING DASHBOARDS

(71) Applicant: SPLUNK INC., San Francisco, CA (US)

(72) Inventors: Camden Marchetti, San Francisco, CA (US); Eason Yicheng Gao, Seattle, WA (US); Jonathan Dillman, San Francisco, CA (US); Peter Peterson, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 17/977,933

(22) Filed: Oct. 31, 2022

(51) Int. Cl.
*G06F 16/242* (2019.01)
*G06F 16/23* (2019.01)
*G06F 16/26* (2019.01)

(52) U.S. Cl.
CPC ...... *G06F 16/2438* (2019.01); *G06F 16/2358* (2019.01); *G06F 16/26* (2019.01)

(58) Field of Classification Search
CPC .............. G06F 16/2358; G06F 16/242; G06F 16/2438; G06F 16/245; G06F 16/2455; G06F 16/2465; G06F 16/248; G06F 16/26; G06F 16/287; G06F 16/335; G06F 16/34; G06F 16/345; G06F 16/9032; G06F 16/90335; G06F 16/903; G06F 16/9035; G06F 16/9038; G06F 16/904; G06F 3/0481; G06F 3/0482; G06F 3/04842; G06F 3/04847; G06F 11/3072; G06F 2203/04803
See application file for complete search history.

(56) References Cited

U.S. PATENT DOCUMENTS

| | | | | |
|---|---|---|---|---|
| 10,852,925 | B2* | 12/2020 | Prophete | G06Q 10/10 |
| 11,055,300 | B2* | 7/2021 | Zhang | H04L 67/02 |
| 2010/0185668 | A1* | 7/2010 | Murphy | G06F 16/252 |
| | | | | 707/E17.014 |
| 2011/0154183 | A1* | 6/2011 | Burns | G06F 16/3344 |
| | | | | 707/706 |
| 2012/0089920 | A1* | 4/2012 | Eick | G06T 11/206 |
| | | | | 715/739 |

(Continued)

*Primary Examiner* — Robert W Beausoliel, Jr.
*Assistant Examiner* — Cheryl M Shechtman
(74) *Attorney, Agent, or Firm* — Artegis Law Group, LLP

(57) ABSTRACT

In various implementations, a client device includes a dashboard rendering framework that processes a dashboard definition. A search query in the dashboard definition is associated with smart source tokens corresponding to lifecycle events of the search query being executed. A dynamic data source transmits the search query to retrieve field values and a token management system automatically sets the smart source tokens to be updated. As the search query is being executed, and the token management system receives updated data values and updates the smart source tokens. The dashboard rendering framework retrieves events with the applicable values for the smart source tokens and renders the dashboard according to the dashboard definition by substituting smart source tokens with the corresponding values. The dashboard rendering framework then updates one or more visualizations in real time as the token management system updates the smart source tokens in real-time.

20 Claims, 13 Drawing Sheets

(56) References Cited

U.S. PATENT DOCUMENTS

| | | | |
|---|---|---|---|
| 2014/0172563 A1* | 6/2014 | Amit | G06Q 50/01 |
| | | | 705/14.54 |
| 2016/0034525 A1* | 2/2016 | Neels | G06F 16/285 |
| | | | 707/737 |
| 2018/0314745 A1* | 11/2018 | Filippi | G06F 16/164 |
| 2018/0314751 A1* | 11/2018 | Filippi | G06F 16/283 |
| 2019/0050463 A1* | 2/2019 | Goradia | G06F 9/451 |
| 2019/0095508 A1* | 3/2019 | Porath | G06F 16/34 |
| 2020/0142930 A1* | 5/2020 | Wang | G06F 16/906 |
| 2024/0037163 A1* | 2/2024 | Parker | G06F 9/451 |

\* cited by examiner

EMBEDDED TOKENS FOR SEARCHES IN RENDERING DASHBOARDS

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding, and effectively utilizing the data. Storing massive quantities of minimally processed or unprocessed data (collectively and individually referred to as "raw data") for later retrieval and analysis is in use by various systems, as storage capacity becomes more inexpensive and plentiful. In general, storing raw data and performing analysis on that data later can provide greater flexibility, as such techniques enable an analyst to analyze all of the generated data, instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures.

DETAILED DESCRIPTION

Figure 1:
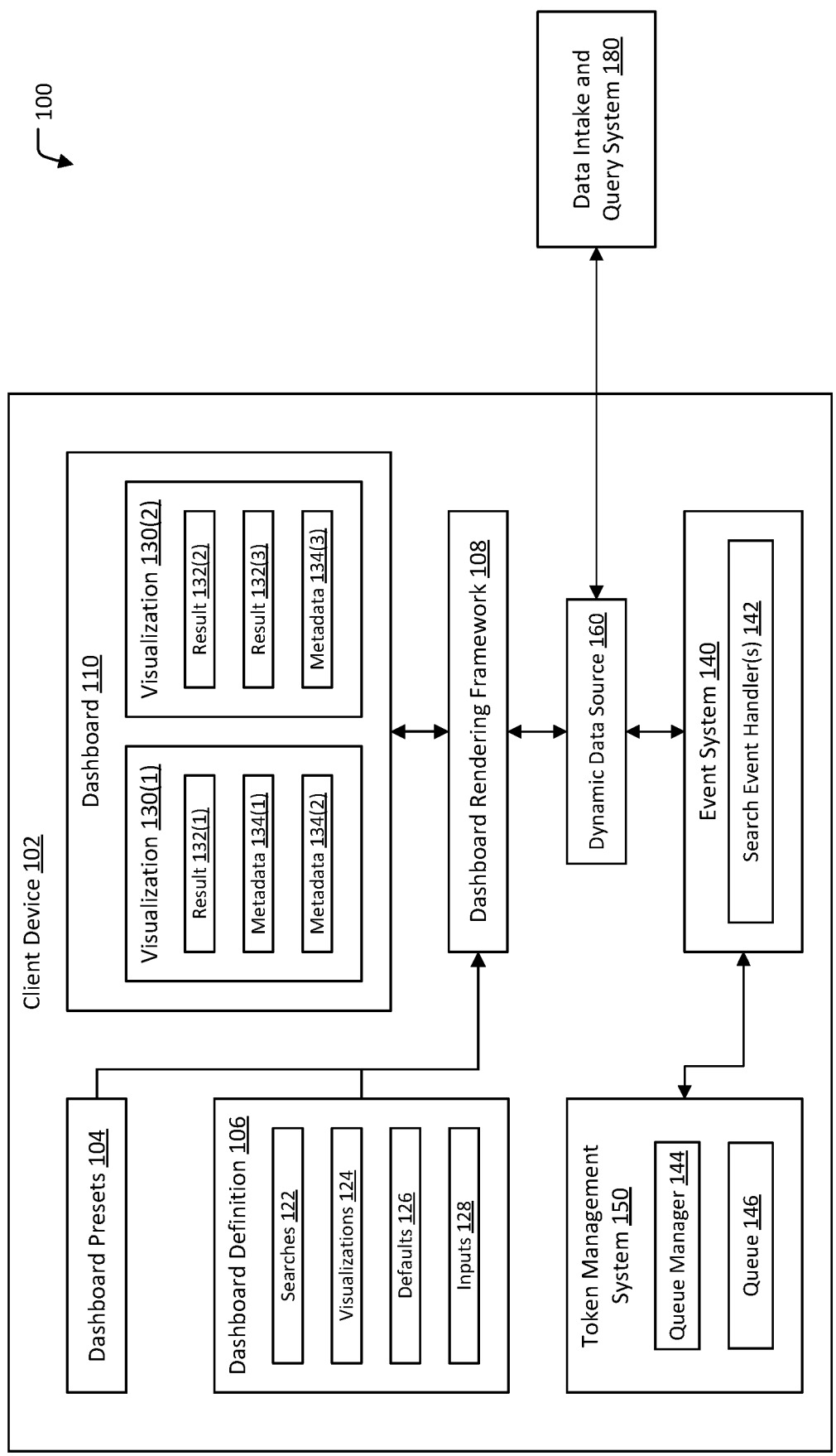
FIG. 1 is a block diagram of a network architecture that renders a dashboard corresponding to a dashboard definition, in accordance with example implementations.

Computer systems regularly include communications devices and interfaces that access and quickly analyze large volumes of data and present the data to an end user. A goal of such user interfaces is to accurately present the retrieved data to the end user in a manner that is easily understandable and engaging. Computer systems can provide a dashboard interface (or dashboard) that presents groups of information in multiple visualizations and menu options. The dashboard allows an end user to view a specific set of data and enables the user to explore a data set or information included in a data store by selecting options that filter data using one or more criteria. When viewing such interfaces, end users access specialized software that provide the tools to view the dashboards and explore specific data in a data set. Designers of the specialized software configure the tools to respond to specific actions, such as selecting specific time ranges, filters in drilldown menus, and so forth, in order to aid the end users to view the relevant information in specific types of visualizations, such as charts, graphs, interactive graphics, etc.

One drawback of current design software for dashboards is that such design software does not automatically update portions of a dashboard with updated information. For example, current design software enables a designer of a dashboard to generate tokens associated with a search query that is to be executed when the dashboard is rendered. In such instances, the designer uses the tokens when creating interactive dashboards in order to represent data retrieved from a search query. Including such tokens in dashboards enables the dashboards to be interactive, as the dashboard responds to specific inputs that an end user provides when viewing a particular portion of the dashboard. However, current design software requires that the end user viewing the rendered dashboard manually set each token used in each visualization. Such requirements for tokens limit how designers use such tokens and limit the number of interactive visualizations that designers include in a dashboard. Further, as such tokens require that a user manually set and unset each token to receive updated data, an end user may not see the most-recent data values associated with a search.

For example, an end user viewing visualizations of real-time machine data is required to manually refresh the dashboard at regular intervals to unset and then set the relevant tokens in order to receive updated data values from the applicable search queries.

Accordingly, in various implementations disclosed herein, a network architecture includes a client device that connects to a data intake and query system. In particular, the client device stores a dashboard definition that a dashboard rendering framework renders for display. The dashboard definition identifies one or more embedded search queries that are to be executed by the data intake and query system to retrieve specific sets of data. The embedded search query is associated with a set of smart source tokens. The smart source tokens include a set of tokens corresponding to fields that the embedded search query retrieves. The smart source tokens also include a set of tokens that correspond to metadata associated with the execution of the embedded search query.

When initially rendering the dashboard, a dynamic data source transmits the embedded search query to the data intake and query system. A search event handler in an event system detects data being handled by the dynamic data source that is associated with the embedded search query. The data includes lifecycle events associated with the execution of the embedded search query. The event search handler causes each of a set of smart source tokens to be automatically set and then dynamically be updated, by a token management system, as the embedded search query is executed. In various implementations, the search event handler forwards the set of smart source tokens to a queue manager in the token management system that queues each of the smart source token and sequentially sets the smart source tokens included in the queue.

As the embedded search query is being executed, the search event handler receives metadata associated with the execution of the embedded search query, including the current status of the execution, progress of the execution, and messages generated by the execution. For each of the smart source tokens, the token management system updates the smart source token with the applicable data. For example, the token management system updates one or more smart source tokens corresponding to fields of the embedded search query with the applicable field values. The token management system also updates one or more smart source tokens corresponding to the metadata fields associated with the execution of the embedded search query with the applicable metadata values.

The dashboard rendering framework retrieves the applicable values for each of the smart source tokens and renders the dashboard according to the dashboard definition. In some implementations, the dashboard rendering framework renders the dashboard with visualizations and/or data sets conditional upon the values of specific smart source tokens. For example, the dashboard rendering framework can refrain from displaying a visualization panel until determining that one of the metadata fields included in the visualization provides a value indicating that a minimum quantity of search results has been retrieved. In another example, the dashboard rendering framework can initially display a message indicating the status of the execution of the embedded search query as 'in progress' by retrieving the metadata field value from a search status smart source token and retrieve and display the completion percentage of the execution of the search query by retrieving the metadata field value from a different smart source token. Upon the search status of the smart source token switching to 'done,' the dashboard rendering platform can replace the search status message with a data visualization that displays one or more of the retrieved field values. In various implementations, the dashboard rendering framework updates one or more visualizations in real time as the dynamic data source provides real-time updates based on additional field values acquired from the data intake and query system.

At least one technical advantage of the disclosed techniques relative to the prior art is that, with the disclosed techniques, designers of dashboards can generate dashboard definitions that include smart source tokens associated with search events that automatically set during execution of a search query. Inclusion of smart source tokens in a dashboard definition enables designers to create dashboards that include additional logic and visual features that are operable to react to data associated with the execution of the search query. Further, end users can run a dashboard rendering framework that renders complex dashboards that updates portions of a dashboard in real time to reflect the data values retrieved from the execution of a search query, as well as metadata associated with the lifecycle events regarding the execution of the search query itself. These technical advantages provide one or more technological improvements over the prior art.

FIG. 1 is a block diagram of a network architecture 100 that renders a dashboard corresponding to a dashboard definition, in accordance with example implementations. As shown, and without limitation, the network architecture includes a client device 102 and a data intake and query system 180. The client device 102 includes, without limitation, dashboard presets 104, a dashboard definition 106, a dashboard rendering framework 108, a dashboard 110, an event system 140, a token management system 150, and a dynamic data source 150. The dashboard definition 106 includes, without limitation, a search definition 122, a visualization definition 124, a defaults definition 126, and an inputs definition 128. The dashboard 110 includes, without limitation, visualizations 130. The visualizations 130 include, without limitation, search results values 132 and metadata values 134. The event system 140 includes, without limitation, one or more search event handlers 142. The token management system 150 includes, without limitation, a queue manager 144 and a queue 146.

For explanatory purposes, multiple instances of like objects are denoted with reference numbers identifying the object and additional numbers identifying the instance where needed (e.g., the client device 102(1)). Further, the network architecture 100 includes multiple instances of devices, even when not shown. For example, the network architecture 100 could include multiple instances of the search event handler 142 (e.g., 142(1), 142(2), 142(3) etc.) and still be within the scope of the disclosed implementations.

In operation, the dashboard rendering framework 108 processes the dashboard presets 104 and the dashboard definition 106 as inputs and renders the dashboard 110 including the visualizations 130(1)-130(2) that are based on the contents of the dashboard definition 106 and the dashboard presets 104. The dashboard presets 104 stores built-in, predefined inputs, visualizations, and/or layouts that the dashboard definition 106 can reference. In some embodiments, the dashboard presets 104 include the dynamic data source 160 and/or the search event handler(s) 142. The dashboard definition 106 includes distinct definitions 122-128 for portions of the dashboard, where components of one definition (e.g., a token representing a field or parameter of a search query) can be referenced by other definitions. The visualization definitions 124 for the visualizations 130(1)-130(2) include tokens specified by the search definition 122. Each token is associated with a specific search that is to be executed and can be included in the visualization definition 124. Some tokens include field value tokens that correspond to specific search results 132 and metadata tokens that correspond to search metadata 134 that are provided as lifecycle events that the search event handler 142 detects when the dynamic data source 160 data intake and query system 180 executes a specific search query.

When rendering a given visualization 130(e.g., the visualization 130(1)), the dashboard rendering framework 108 generates, using the dynamic data source 160, a data request for retrieving the data specified in the visualization 130. The data request specifies the one or more search queries that are specified in the search definition 122. The dynamic data source 160 transmits to the data intake and query system 180. In various implementations, the search event handler 142 in the event system 140 detects lifecycle events associated with the data request (e.g., status of the search query, execution time, retrieved field values, etc.) and responds by generating and setting a set of smart source tokens (not shown) associated with the execution of the search query. In some implementations, the search event handler 142 transmits the generated smart source tokens to the queue manager 144, which places the smart source tokens in the queue 146. The queue manager 144 then sequentially retrieves the smart source tokens from the queue 146 and sets the smart source tokens.

The dynamic data source 160 acts as a local data source for the dashboard rendering framework 108 by retrieving field values from the data intake and query system 180. In various embodiments, the dynamic data source 160 transmits the data request to the data intake and query system 180. The data intake and query system 180 executes the search query to extract field values from a data set. In various implementations, the data set is stored in an indexing system that processes and stores data generated by a specific data source. Execution of the search query causes the dynamic data source 160 to generate data in the form of lifecycle events. In some embodiments, the lifecycle events includes both the extracted field values received from the data intake and query system 180, as well as metadata associated with the execution of the search query. The search event handler 142 acquires the data generated by the dynamic data source 160, enabling the dashboard rendering framework 108 to acquire values corresponding to specific smart source tokens and causes the token management system 150 to update the smart source tokens with the applicable values, in such instances, the dashboard rendering framework 108 substitutes the smart source tokens included in the dashboard 110 with the corresponding data for the updated smart source tokens (e.g., updated field values and updated metadata values), and updates the visualizations 130(1)-130(2) to include the updated field values and the updated metadata values.

The client device 102 stores the dashboard presets 104 and the dashboard definition 106 for the dashboard rendering framework 108 to process. The dashboard presets 104 stores built-in, predefined inputs, visualizations, and/or layouts that the dashboard definition 106 can reference. The dashboard definition 106 includes multiple sets of instructions that define the contents of the dashboard 110. Such instructions include search instructions 122 that define specific search queries that are to be run and smart source tokens representing components of the search queries and associated lifecycle events. The instructions also include visualization instructions 124 that specify the contents and composition of one or more visualizations 130.

The dashboard 110 is a graphical user interface that includes a set of visualizations 130(1)-130(2) displayed in a single panel or a group of panels. In various implementations, the dashboard 110 organizes underlying data (e.g., field values extracted from the stored data, analytics provided by the data intake and query system 180, and/or the data sources generating the data, etc.) into an interface for display to an end user. In some implementations, the dashboard includes multiple panels, where a panel includes a set of visualizations that are displayed concurrently in a single window of the dashboard 110.

In various implementations, the visualizations 130 display various types of textual graphical information types that provide information to a user. The graphical information includes charts (e.g., histogram charts, graphs, donut charts, circle charts, timelines, etc.), lists, tables, and other discrete forms of visual information communication. In some implementations, each visualization 130 is discrete from other visualizations 130. Through the dashboard 110, end users can view one or more visualizations 130 to identify relationships between metrics, identify trends, and determine when problems or issues may exist. In some implementations, the dashboard rendering framework 108 populates the dashboard 110 is using data received from execution of search queries specified in the search definitions 122. For example, the dashboard rendering framework 108 can initially generate one or more visualizations 130 based on specific data values included in a set of field values retrieved by the data intake and query system 180 (e.g., a visualization 130(1) displaying the maximum value in a subset of field values). The dashboard rendering framework can then update the one or more visualizations 130 included dashboard 110 continually and in real time as additional data is received.

The dashboard rendering framework 108 includes one or more applications that display, compute, and/or generate data based on data received from the data intake and query system 180. In some implementations, the dashboard rendering framework 108 uses specific search queries embedded in the dashboard definition 106 (e.g., the searches included in the search definitions 122) to retrieve specific field values, extracted from events, which are associated with a specific object, an occurrence, and/or a physical environment. In various implementations, dashboard rendering framework 108 generates content (e.g., schemas, cards, and/or visualizations) based on the extracted field values provided by the data intake and query system via the dynamic data source 160 and populates the dashboard 110 with the generated content.

In various implementations, the dashboard rendering framework 108 retrieves data by querying an indexing system that stores data generated by a specific data source. In some implementations, the indexing system includes one or more field-searchable data stores that are accessible via the data intake and query system 180. For example, the dashboard rendering framework 108 could be an instance of the SPLUNK® ENTERPRISE system, an application within a cloud-based environment, such as SPLUNK CLOUD™, an application for a self-service cloud, or another deployment of an application that implements the Splunk processing language (SPL).

For example, the dashboard rendering framework 108 could transmit a data request to the data intake and query system 180 in order to extract one or more fields of data from a field-searchable data store. In such instances, the data intake and query system 180 could retrieve the extracted fields as portions of a text string, such as: 2018 Jul. 28 00:07:01,781 INFO [async_client] [async_client] [async_post_request] POST headers={'Authorization': u'Splunk M4q2ROpGJCpng81Wi8JJsyVlyGIxrIhI_1UsIUxvVk3m_I12q6Q83Drf7P68v8H68kvQ7RHg A2eJz50-LSnw4d00ywEsTodODOjdWDNGhj9zFGN-RuCiBWovEyXnO25X3_aNjSwyO_rE ik7', Content-Type: application/json'}, uri=https://127.0.0.1:8089/servicesNS/nobody/spacebridge-app/storage/collections/data/alert_recipient_devices, params=None, data={"py/object": "spacebridgeapp.data.alert_data. RecipientDevice", "timestamp": "15327364 21.201776", "alert_id": "5b5bb3a580db6133e603d33f", "device_id": "y+DJALQwOXER wVDBzUe34OyalMINAIdOIPzRBdtt91U="} host=ip-10-0-240-141 source=/opt/splunk/var/log/splunk/spacebridge-app.log sourcetype=spacebridge-app-too_small.

In some implementations, the data intake and query system 180 sends messages to the dashboard rendering framework 108 in accordance with a push notification service (not shown), such as the APPLE® Push Notification service (APN), or GOOGLE® Cloud Messaging (GCM). For example, the dashboard rendering framework 108 could receive various schemas, playbooks, runbooks, cards, and/or visualizations that include real-time data associated with a particular machine and/or set of field-searchable events.

In various implementations, the dashboard definition 106 and/or the dashboard presets 104 specify one or more components of a given visualization 130. In some implementations, the dashboard presets 104 link multiple components within the dashboard definition 106. For example, the dashboard presets 104 can include default or additional built-in layouts, visualizations, searches, inputs, and/or data sources that a given dashboard 110 can reference. In various implementations, the dashboard rendering framework 108 references contents of the dashboard presets 104 for a particular visualization 130(1) and translates the components of the dashboard definition 106 using the dashboard presets 104 to generate the visualization 130(1).

The dashboard definition 106 defines one or more portions of the dashboard 110 that are to be rendered. For example, the dashboard stores one or more definitions 122-128 that specify, for each visualization 130, the visualization type, the dataset to use for the visualization, the style, the font colors, and the color encoding for the dataset in the visualization. In some implementations, the dashboard definition specifies one or more location identifiers within a cell for displaying components of the visualization (e.g., location of text in the visualization), text to display, an indication of whether to include legends and labels to add, and other display parameters of the visualization. In one or more implementations, the dashboard definition 106 is defined in JavaScript Object Notation (JSON) or extensible markup language (XML) format. In various implementations, the dashboard definition 106 includes one or more search definitions 122, visualization definitions 124, defaults definitions 126, and/or inputs definitions 128.

For example, the parameters specified in the visualization definition 124 include the colors and/or color scheme, size, data (e.g., field values and/or metadata), and any other parameters of the visualization. In some implementations, the data is represented by one or more smart source tokens that represent specific data, such as specific fields that are to be retrieved or specific portions of metadata associated with the execution of the search query. The visualization definition 124 also specifies how to place the location of lines, shapes, and characters in particular visualization types. In some implementations, the placement of components is based on a set of input parameters associated with the data for the visualization 130. The visualization type is the particular type of chart, list, or other type.

The event system 140 tracks data associated with one or more events associated with the production environment and/or the data intake and query system 180. In various implementations, the event system 140 includes one or more event handlers, such as one or more search event handlers 142 that detect and track lifecycle events. A lifecycle event corresponds data associated with components of the networked environment 100, such as the data intake and query system 180 and/or the dynamic data source 160 executing a given search query. The search event handler 142 tracks the progress of the execution of the search query and receives data from the dynamic data source 160 in the form of data (e.g., field values extracted from events stored one or more field-searchable data stores) and/or metadata associated with the execution of the search query itself.

In some implementations, the event system 140 includes different types of search event handlers 142. For example, the event system 140 can include string-type search event handlers that receive string-type field values as the search results. In such instances, the event system 140 includes other types of search event handlers 142 that receive different types of data (e.g., Boolean search event handlers 142 that receive Boolean values, etc.). In some implementations, the event system 140 can include other types of event handlers 142. For example, the event system 140 can include distinct search event handlers 142 that manage lifecycle events associated with different types of search queries (e.g., saved searches, chain searches, etc.).

The token management system 150 is included in the client device 102 and includes the queue manager 144 and/or the queue 146. The client device 102 executing the token management system 150 manages the smart source tokens included in the queue 146. For example, the queue manager 144, upon receiving smart source tokens associated with lifecycle events for a search query, adds each of the smart source tokens to the queue 146. Upon adding the smart source tokens to the queue 146, the queue manager 144 sequentially sets each of the smart source tokens.

The data intake and query system 180 stores and processes large quantities of data in a manner that enables end users to access portions of the data in real-time. As will be discussed in further detail below in FIGS. 10-13, the data intake and query system 180 collects various types of data, such as machine data generated by one or more data sources, and stores as the data "events" in an indexing system. An event comprises a portion of machine data and is associated with a specific point in time. In various implementations, the data intake and query system 180 retrieves specific portions of data by extracting specific field values from the events. In various implementations, the data intake and query system 180 performs one or more jobs simultaneously by executing search queries on data generated by specific data sources and/or specific field-searchable data stores.

Additionally or alternatively, the search event handler 142 detects metadata associated with the lifecycle of a given job, such as the status of the job (e.g., done, in progress, stopped, cancelled, etc.), the number of results, and so forth. In such instances, the search event handler 142 detects the metadata generated by the dynamic data source 160 and provides the metadata to the token management system. The metadata is accessible by the dashboard rendering framework 108 for use in rendering the visualization 130. For example, the dashboard rendering framework 108 can retrieve specific metadata values 134(1)-134(3) when rendering the visualizations 130(1)-130(2) and use the metadata values 134(1)-134(3) to determine whether to make the visualizations 130(1)-130(2) visible to the end user. For example, when the dashboard rendering framework 108 retrieves a 'Y' Boolean value for a search error metadata token, the dashboard rendering framework 108 can respond to the 'Y' Boolean value by displaying an error notification in lieu of the applicable visualization.

Figure 2:
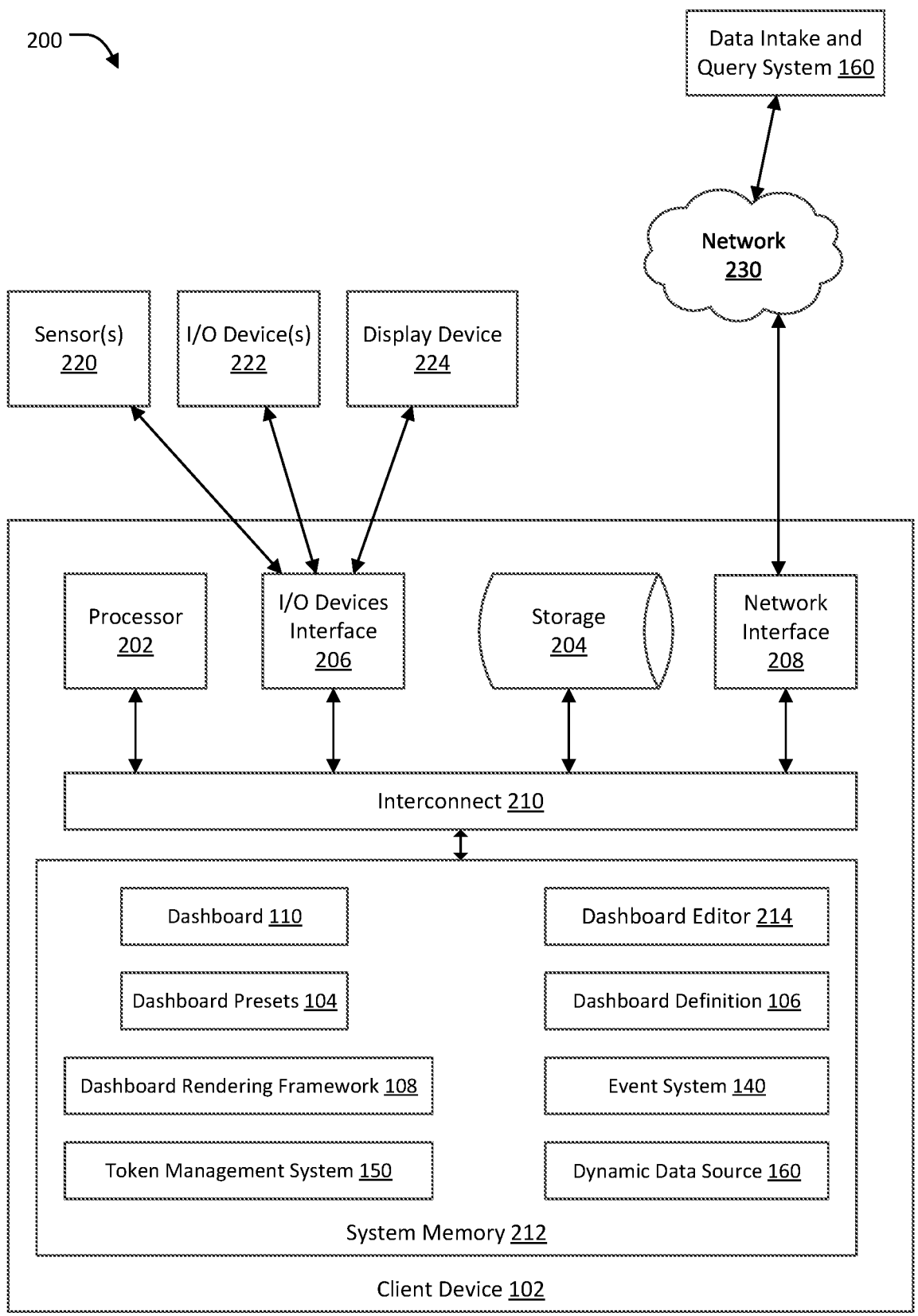
FIG. 2 illustrates an example client device included in the network architecture of FIG. 1, in accordance with example implementations.

FIG. 2 illustrates an example client device 102 included in the network architecture 100 of FIG. 1, in accordance with example implementations. As shown, the data processing environment 200 includes, without limitation, the data intake and query system 180 and the client device 102 communicating with one another over the network 230. The client device 102 includes, without limitation, a processor 202, storage 204, an input/output (I/O) device interface 206, a network interface 208, an interconnect 210, and system memory 212. The system memory 212 includes, without limitation, the dashboard rendering framework 108, the event system 140, the token management system 150, the dynamic data source 160, a dashboard editor 214, the dashboard presets 104, the dashboard definition 106, and the dashboard 110. The data intake and query system 180 and the client device 102 function substantially the same as described in conjunction with FIG. 1, except as further described herein.

Examples of the client device 102 include, without limitation, a mobile device (e.g., a smartphone, a tablet computer, a handheld computer, a wearable device, a portable media player, a virtual reality (VR) console, an augmented reality (AR) console, a laptop computer, a desktop computer, a server, a gaming device, a streaming device (e.g., an Apple TV® device, a Roku® device, etc.), and so forth.

In general, the processor 202 retrieves and executes programming instructions stored in the system memory 212. In various implementations, the processor 202 is any technically feasible form of processing device configured to process data and execute program code. The processor 202 could be, for example, a central processing unit (CPU), a graphics processing unit (GPU), an application-specific integrated circuit (ASIC), a field-programmable gate array (FPGA), and so forth. The processor 202 stores and retrieves application data residing in the system memory 212. The processor 202 is included to be representative of a single CPU, multiple CPUs, a single CPU having multiple processing cores, and the like. In operation, the processor 202 is the manager processor of the client device 102, controlling and coordinating operations of other system components.

The system memory 212 stores software application programs and data for use by the processor 202. For example, the system memory 212 could include, without limitation, the dashboard rendering framework 108, the dashboard editor 214, the dashboard presets 104, the dashboard definition 106, and the dashboard 110. The processor 202 executes software application programs stored within the system memory 212 and, optionally, an operating system. In particular, the processor 202 executes software and then performs one or more of the functions and operations set forth in the present application.

The dashboard rendering framework 108 includes one or more applications that display, compute, and/or generate data based on data received from the data intake and query system 180. In various implementations, the dashboard rendering framework 108 transmits messages to the data intake and query system 180 to retrieve data associated with rendering the dashboard 110. Such data includes sets of field values associated with data generated by a particular data source and/or metadata associated with the data intake and query system 180 executing queries to retrieve the field values. In some implementations, the data intake and query system 180 retrieves field values by extracting portions of data from events, which are associated with a specific object or physical environment. In various implementations, the client device 102 and/or the data intake and query system 180 may generate content (e.g., schemas, cards, and/or visualizations) based on the extracted field values and include the content in the dashboard 110.

The dashboard editor 214 is a user interface and underlying software for creating the dashboard definition 106 that the dashboard rendering framework 108 uses to render the dashboard 110. In various implementations, the dashboard editor 214 includes various editing interfaces and/or modules, such as a visualization editor, a data source editor, and a layout editor.

The visualization editor enables a designer to edit aspects of individual visualizations 130. In some implementations, the visualization editor includes a user interface and interpretation software for building a visualization definition 124 that the dashboard rendering framework 108 uses to render the visualization 130 for display. In some implementations, the visualization editor edits portions of the dashboard definition 106 and/or the dashboard presets 104. Additionally or alternatively, the dashboard editor 214 includes an interpreter. The interpreter is computer readable program code that parses the dashboard definition 106 and/or the dashboard presets 104 to extract information and passes the extracted information to the dashboard rendering framework 108 to render the visualization 130.

The data source editor enables a designer to edit aspects of the one or more data sources and/or the search queries to retrieve data generated by the one or more data sources. For example, the data source editor includes the functionality to assign a unique name and/or a unique identifier to a data source, generate search queries for data generated by the data source, specify options for the data source (e.g., data source type, search query parameters, etc.), refresh rate, and so forth. The data source editor enables the designer to provide a unique name for the data source and generate other components based on the data source name. For example, upon naming the data source (e.g., "bikestats"), the dashboard editor 214 can embed search queries that use the unique name of the data source to easily identify the particular data source.

The layout editor includes functionality to modify the layout of the dashboard 110 based on one or more inputs of a designer. In some implementations, the layout editor propagates changes and automatically sizes and resizes visualizations 130 without additional inputs from the designer. For example, in response to receiving a designer input to add, move, or remove a visualization 130, the layout editor algorithmically adjusts the layout to avoid or mitigate for null space (i.e., where no visualization 130 is present), perform automatic alignment, and maintain sizing requirements of visualizations 130. Additionally or alternatively, the dashboard rendering framework 108 implements the layout editor to adjust the layout based displaying a subset of visualizations 130 included in the dashboard definition 106 (e.g., removing visualizations 130 from display when the visibility is set to 'N').

The storage 204 is a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). The processor 202 communicates to other computing devices and systems via the network interface 208, where the network interface 208 is configured to transmit and receive data via one or more communications networks 230.

The interconnect 210 facilitates transmission, such as of programming instructions and application data, between the processor 202, the input/output (I/O) device interface 206, the storage 204, the network interface 208, and the system memory 212. The I/O device interface 206 is configured to receive input data from user I/O devices 222. These I/O devices 222 include, without limitation, sensor(s) 220(e.g., one or more cameras, location sensor(s), etc.), input device(s) 222 (e.g., a keyboard, stylus, microphone, etc.), and/or a display device 224. The display device 224 generally represents any technically feasible means for generating an image for display. For example, the display device 224 could be a liquid crystal display (LCD) display, an organic light-emitting diode (OLED) display, or a digital light processing (DLP) display. The sensor 220, such as camera, acquires images via a lens and converts the images into digital form. The images acquired by the camera may be stored in the storage 204 and/or the system memory 212. An acquired image may be displayed on the display device 224, either alone or in conjunction with one or more other acquired images, graphical overlays, and/or other data.

In various implementations, the sensor(s) 220 include location sensors that enable the client device 102 to determine the physical location and/or orientation of the client device 102. In some implementations, the location sensor(s) may include a network-based sensor that communicates with the data intake and query system 180 via the network 230, which may be part of a production-monitoring network. In some implementations, the location sensor(s) include a network-based sensor that communicates with one or more data intake and query systems 160 via a local area network (LAN) and/or a wide area network (WAN). In various implementations, the production-monitoring environment may include multiple objects (e.g., sensor data devices) and/or multiple client devices 102. Each of the client devices 102 communicate with the data intake and query system 180, and each of the client devices 102 is capable of identifying one or more objects in the physical environment based on identifier tags, geofences, and/or any other object-identification technique.

The I/O devices 222 may include a microphone that acquires audio signals for storage and analysis. Additional examples of user I/O devices 222 (not explicitly shown) may include one or more buttons, a keyboard, and a mouse or other pointing device. The I/O device interface 206 also includes an audio output unit configured to generate an electrical audio output signal, and the additional user I/O devices 222 further include a speaker configured to generate an acoustic output in response to the electrical audio output signal.

Figure 3:
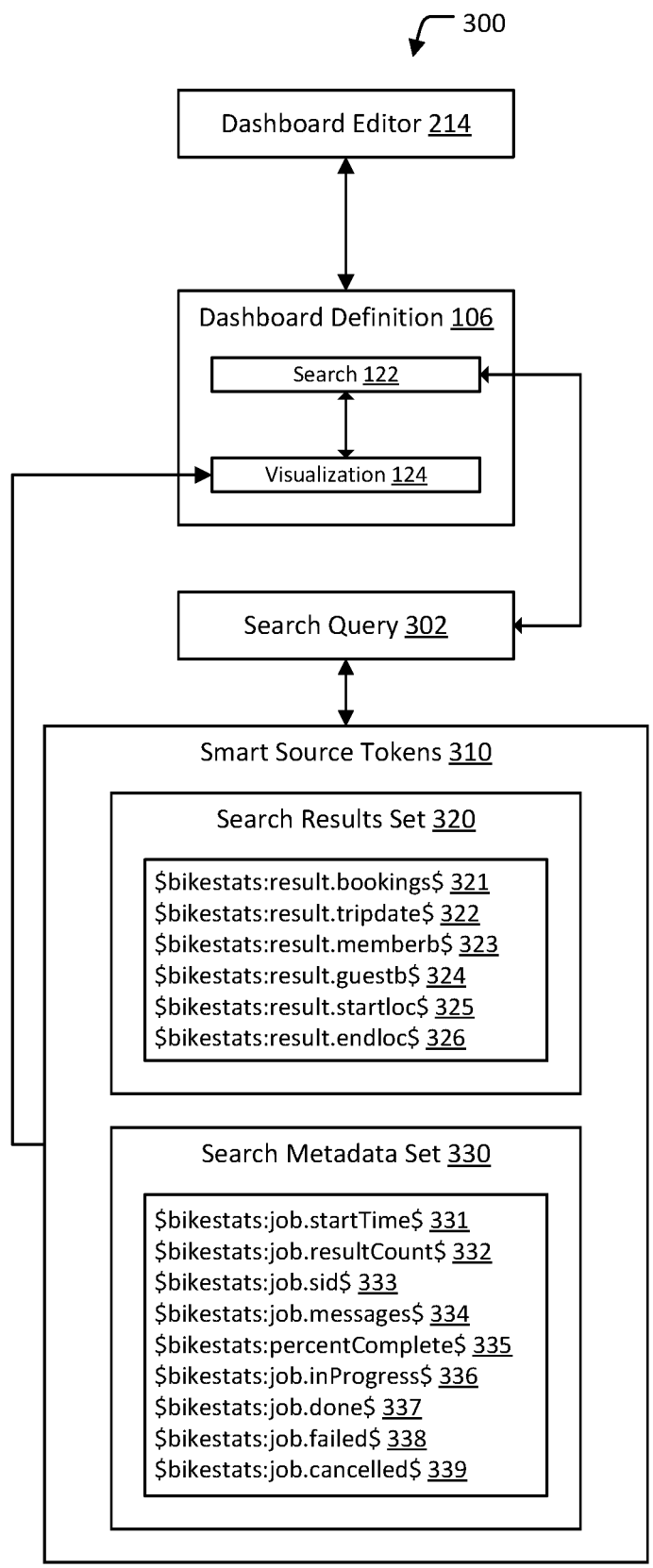
FIG. 3 is a block diagram of an editor establishing a dashboard definition of FIG. 1 using one or more smart source tokens corresponding to an embedded search query, in accordance with example implementations.

FIG. 3 is a block diagram 300 of an editor 214 establishing a dashboard definition 106 of FIG. 1 using one or more smart source tokens 310 corresponding to an embedded search query 302, in accordance with example implementations. As shown, and without limitation, the block diagram 300 includes the dashboard editor 214, the dashboard definition 106, an embedded search query 302, and the smart source tokens 310. The dashboard definition 106 includes a search definition 122 and a visualization definition 124. The smart source tokens 310 include a search results set 320 and the search metadata set 330. The search results set 320 includes search results tokens 321-326. The search metadata set 330 includes search metadata tokens 331-339.

In operation, the dashboard editor 214 generates contents for the dashboard definition 106. The contents of the dashboard definition 106 includes a search definition 122 defining the embedded search query 302. The search query 302 is associated with a set of corresponding smart source tokens 310. The smart source tokens 310 track values for specific components of the search query 302. One or more of the smart source tokens 310 are used in the visualization definition 124 to define how the visualization 130 is to be rendered. For example, the visualization definition 124 can include one or more search results tokens (e.g., search results tokens 321, 323) to represent a set of field values that are to be retrieved by the search query 302 when the dashboard rendering framework 108 renders the visualization 130. When the dashboard rendering framework 108 renders the dashboard 110 from the dashboard definition 106, the search event handler 142 identifies the applicable portions of the search query 302 and automatically tokenizes the smart source tokens 310 associated with the lifecycle of the search query 302. In some implementations, the search event handler 142 automatically causes the token management system 150 to set each of the smart source tokens 310. Setting each of the smart source tokens 310 causes the respective fields in the visualization represented by the smart source tokens 310 to be updated in real time.

In various implementations, the search definition 122 includes information about the data source that is generating the data associated with the embedded search query 302. Such information can include a unique identifier for the data source, a data source type, a name for the data source, a refresh rate, and a set of options (e.g., saved queries, query parameters, etc.). In some implementations, the search definition 122 identifies multiple data sources (e.g., a trip route data source, a payment data source, etc.). In such instances, the search definition 122 can include information about each of the data sources included in the search query 302. The search definition 122 also includes information about the parameters of the query, such as the fields in the indexing system that are to be extracted, and metadata about the search event.

The smart source tokens 310 includes one or more tokens that directly reference components of the search query 302 and the lifecycle event (e.g., the execution of the embedded search query 302). In various implementations, the dashboard editor 214 enables designers to add one or more of the smart source tokens 310 into other definitions 124-128 to represent specific data and/or specific metadata. Adding the smart source tokens 310 to other definitions 124-128 included in the dashboard definition 106 to enable complex dashboards that automatically respond to specific data values associated with the search query 302.

In various implementations, the dashboard definition 106 specifies that the smart source tokens 310 are of one of a group of available types. The smart source tokens 310 can be one of a string, a Boolean, a number, and so forth. For example, the "start location" search results token 325 can be a string that includes multiple textual entries for specific descriptions ("1st Avenue & Pine Street"). In another example, the "start location" search results token 325 can be a number that includes specific identifier number or specific global positioning system (GPS) coordinates.

In various implementations, the dashboard editor 214 includes one or more of the search results tokens 321-326 from the search results set 320 in portions of the dashboard definition 106 to represent the field values that the embedded search query 302 retrieves. For example, the visualization 130 can be defined by the visualization definition 124, where the visualization definition 124 includes the "total bookings" search results token 321 and the "member bookings" search results token 323 to represent the corresponding field values that are retrieved when the data intake and query system 180 executes the embedded search query 302 on data provided by a data source generating booking data. When the dashboard rendering framework 108 renders the visualization 130, the dashboard rendering framework 108 replaces the respective search results tokens 321, 323 within the visualization 130 with the corresponding field values.

In some implementations, dashboard editor 214 make portions of the dashboard 110 conditional on specific values for one or more of the smart source tokens 310. In such instances, the dashboard definition 106 includes one or more portions that the dashboard rendering framework 108 renders conditionally depending on the specific values associated with the embedded search query 302. For example, a visualization definition 124 can include a parameter that makes visibility of the visualization 130 conditional on one or more parameters associated with the search event (e.g., the "search status done" metadata token 337 having a Boolean value of 'Y', the "result count" metadata token 332 exceeding a minimum threshold quantity, etc.). In such instances, the dashboard rendering framework 108 will prevent the visualization 130(2) from being visible within the dashboard 110 until all of the conditions are met.

Figure 4:
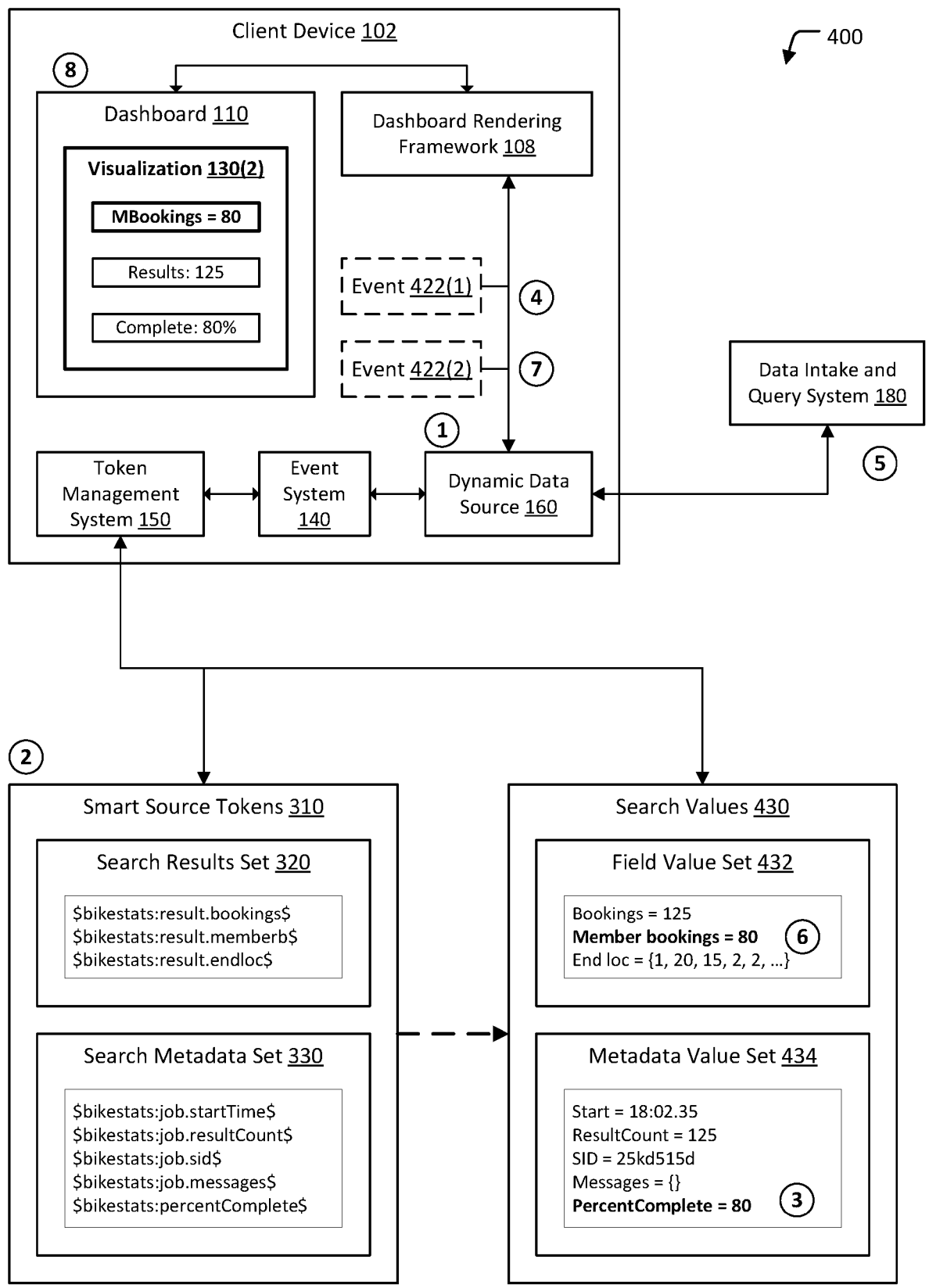
FIG. 4 illustrates a block diagram of a client device included in the network architecture of FIG. 1 rendering a dashboard based on the dashboard definition, in accordance with example implementations.

FIG. 4 illustrates a block diagram 400 of a client device 102 included in the network architecture 100 of FIG. 1 rendering a dashboard 110 based on the contents of the dashboard definition 106, in accordance with example implementations. As shown, and without limitation, the block diagram 400 includes the client device 102, the data intake and query system 180, the smart source tokens 310, and search values 430. The client device 102 includes the dashboard rendering framework 108, the dashboard 110, the event system 140, the token management system 150, the dynamic data source, the visualization 130(2), and events 422.

In operation, the dashboard rendering framework 108 renders the dashboard 110 by retrieving the search query 302 from the dashboard definition 106. The dashboard rendering framework 108 transmits a data request that includes the search query 302. The dynamic data source 160 transmits the search query 302 to the data intake and query system 180. The event system 140 detects the data handled by the dynamic data source 160 and causes the set of smart source tokens 310 associated with the embedded search query 302 to be set. In some implementations, the search event handler 142 automatically sets each of the smart source tokens 310. Alternatively, in some implementations, the search event handler 142 transmits the smart source tokens 310 to the token management system 150, where the queue manager 144 adds each of the smart source tokens 310 to the queue 146 and sequentially sets the smart source tokens 310.

The data intake and query system 180 executes the embedded search query 302 on an index of data created by one or more data sources. Execution of the embedded search query 302 generates sets of data values, including a set of search results values corresponding to field values extracted by the data intake and query system 180 from data stored in the index. The sets of data values also include a set of metadata values corresponding to metadata regarding the execution of the search query 302. The search event handler 142 identifies data handled by the dynamic data source 160 and updates the values for each of the respective smart source tokens 310. When rendering the dashboard 110, the dashboard rendering framework 108 receives the search values from the dynamic data source 160 event system 140 and/or values corresponding to smart source tokens 310 via the token management system 150 . . . . For example, the dashboard rendering framework 180 initially retrieves specific values from the metadata value set 434 as event 422(1) when initially rendering the visualization 130(2), then updates the field value set 432 as event 422(2) when the execution of the search query 302 is complete.

For explanatory purposes only, a series of numbered bubbles labeled 1-8 depicts an example series of operations that occur when the dashboard rendering framework 108 renders a dashboard 110 that includes a visualization 130(2) defined with one or more fields and/or metadata provided by the embedded search query 302.

As depicted with the bubble numbered 1, the dynamic data source 160 handles a search query 302. In various implementations, the dashboard rendering framework 108 retrieves information about the data source and/or the search query 302 from the dashboard definition 106. For example, the dashboard rendering framework 108 can retrieve the search query 302 from the search definition 122, where the search definition identifies the applicable data source from which the data intake and query system 180 is to retrieve field values.

As depicted with the bubble numbered 2, the token management system 150 set the smart source tokens 310 corresponding to portions of the search query 302. In various implementations, the token management system 150 responds to data identified by the event system 140 by tokenizing portions of the search query 302 to represent portions of the search query 302 and/or metadata associated with the execution of the search query.

For example, when the dynamic data source 160 processes the query parameters of the search query 302, the search event handler 142 identifies a set of fields. For each of the identified fields, the search event handler 142 causes the token management system 150 to generate a distinct search results token for the search results set 320. In such instances, the search results set 320 includes a search results token for each respective field in the search query 302, representing the field values that the data intake and query system 180 is to extract from the indexing system. In some implementations, the search results set 320 includes additional search results tokens corresponding to fields that are not included in the dashboard 110. In such instances, the search event handler 142 and/or the token management system 150 can filter the set of field values that is returned to the dashboard rendering framework 108, removing the unused field values. Additionally or alternatively, in some implementations, the smart source tokens 310 includes a search metadata set 330 that correspond to portions of the lifecycle event associated with the execution of the search query 302. For example, the search metadata set 330 includes, smart source tokens representing the time at which the data intake and query system 180 started the job of executing the embedded search query 302. In some implementations, the queue manager 144 can receive multiple smart source tokens 310(e.g., smart source token sets 310 (1), 310(2), 310(3), etc.) corresponding to multiple embedded search queries 302. In such instances, the queue manager 144 can manage the times at which the smart source tokens 310 are set. The management of the smart source tokens 310 can be achieved through the sequential setting of the tokens (e.g., a time delay of 1 ms between each token).

As depicted with the bubble numbered 3, token management system 150 updates one or more smart source tokens. In various embodiments, the event system 140 acquires data associated with the lifecycle events regarding the execution of the search query 302. In such instances, the token management system 150 updates a portion if the smart source tokens 310 as the state of one or more portions of the lifecycle event changes. In some implementations, search event handler 142 determines one or more specific metadata values (e.g., acquired notification messages, search identifier, start time, completion percentage, etc.) as the search query 302 is being executed. In such instances, the token management system 150 updates one or more of the smart source tokens while the search is executing.

As depicted with the bubble numbered 4, the dashboard rendering framework 108 receives an event 422(1) from the token management system 150. In some implementations, the dashboard rendering framework 108 acquires data values corresponding to specific smart source tokens 310 while the search is executing. In such instances, the dashboard rendering framework 108 retrieves data values for the search values 430 as an event 422. For example, token management system 150 retrieves the completion percentage value included in the metadata value set 434. The dashboard rendering framework 108 receives the event 422(1) that includes the completion percentage value from the metadata value set 434. In some embodiments, the dashboard rendering framework 108 generates the visualization 130(2) to display the completion percentage value. In some implementations, the dashboard rendering framework 108 determines whether to render the visualization 130(2) based on the values included in the event. For example, the dashboard rendering framework 108 can refrain from rendering the visualization 130(2) until specific thresholds (e.g., the completion percentage value >50) is satisfied.

As depicted with the bubble numbered 5, the data intake and query system 180 executes the search query 302. In various implementations, the data intake and query system 180 executes the search query 302 to extract an applicable set of field values from the data stored in the indexing system. In some implementations, the search query 302 identifies multiple data sources that produce the applicable data stored in the indexing system. In such instances, the data intake and query system 180 performs multiple jobs by executing the applicable portions of the search query 302 on each portion of the identified data associated with the respective data sources.

As depicted with the bubble numbered 5, the token management system 150 updates the smart source tokens 310 with values received from the data intake and query system 180. As the data intake and query system 180 performs the job and provides field values from the indexing system, the event system 140 identifies the field values and causes the token management system 150 to update the search results values. For example, the token management system 150 can update one or more smart source tokens included in the search result set 320 using the received field values provided by the data intake and query system 180. Additionally or alternatively, the updates include updated metadata values. In such instances, the token management system 150 further updates one or more smart source tokens in the search metadata set 330 with updated metadata values.

As depicted with the bubble numbered 7, the dashboard rendering framework 108 receives an additional event 422(2) from the token management system 150. In some implementations, the dashboard rendering framework 108 acquires data values corresponding to specific smart source tokens 310 as the search further executes. In such instances, the dashboard rendering framework 108 retrieves additional data values for the search values 430 as an additional event 422(2). For example, token management system 150 member bookings value included in the field value set 432. The dashboard rendering framework 108 receives the event 422(2) that includes the member bookings value from the field value set 432.

As depicted with the bubble numbered 8, the dashboard rendering framework 108 updates the dashboard 110 based on the contents of the event 422(2). In various implementations, the dashboard rendering framework 108 generates one or more visualizations 130 defined by the dashboard definition 106. In various implementations, one or more of the visualization definitions 124 include smart source tokens 310 that represent field values that the data intake and query system 180 provided when executing the search query 302. The dashboard rendering framework 108 renders the visualization 130(2) by retrieving the applicable set of search values from the search value set 430 and substituting the smart source tokens with the corresponding the search values.

For example, the visualization 130(2) can be defined by a visualization definition 124(4) that includes the "member bookings" search results token 323, the "result count" metadata token 332, and the "completion percentage" metadata token 335. The visualization definition 124(4) can include a visibility definition with conditional statements indicating that the visualization 130(2) is only to be visible when the number of results exceeds 50 and the search is at least 50% complete. In such instances, the dashboard rendering framework 108 initially receives data values in the event 422(1) for one or more of the smart source tokens 310 and determines whether to the visualization 130(2) is to be visible based on the retrieved data values meeting the conditional statements. The dashboard rendering framework 108 can determine that the data values in event 422(1) did not meet all conditionals and refrain from displaying the visualization 130(2). When the dashboard rendering framework 108 subsequently receives the event 422(2), the dashboard rendering framework 108 compare the data values included in the event 422(2) with each of the conditional statements. Upon determining that all conditionals are met, the dashboard rendering framework 108 displays the visualization 130(2) with the field value for the "member bookings" field at the location specified by the visualization definition 124(2).

In various implementations, the token management system 150 periodically updates the field value set 432 and/or the metadata value set 434 based on the updates that the dynamic data source 160 receives from the data intake and query system 180. In such instances, updates to the search values 430 can cause the dashboard rendering framework 108 to receive additional events 422 and cause the dashboard rendering framework 108 to update the rendering of the dashboard 110 based on the new values included in the additional events 422.

Figure 5:
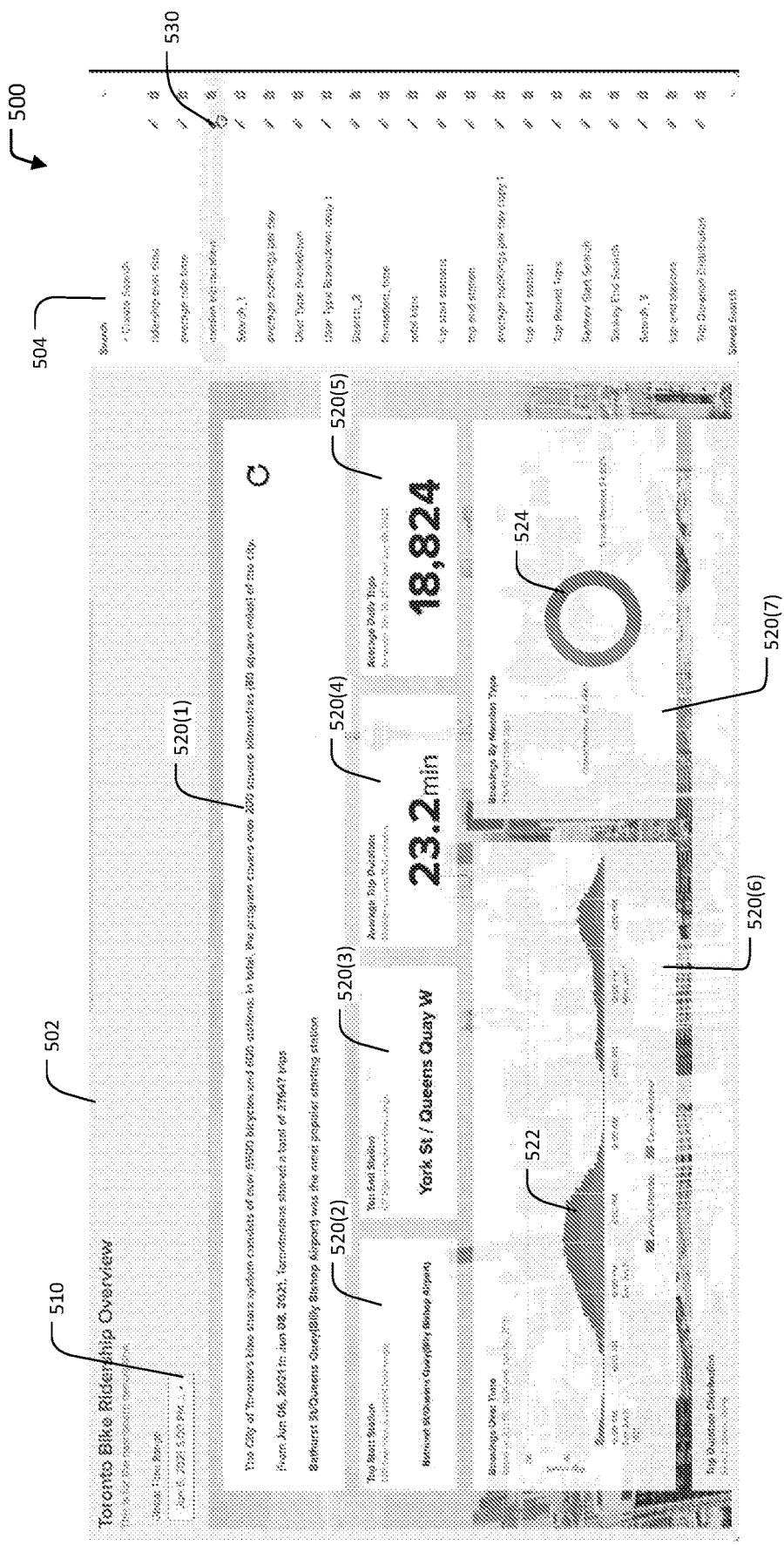
FIG. 5 is an example dashboard included in the network architecture of FIG. 1 and a list of searches included in the dashboard, in accordance with example implementations.

FIG. 5 is an example dashboard 500 included in the network architecture 100 of FIG. 1 and a list of searches 504 included in the dashboard 500, in accordance with example implementations. As shown, the dashboard 500 includes, without limitation, a dashboard layout 502, a selectable menu 510, visualization panels 520, and a search query list 504.

In operation, the dashboard editor 214 provides the dashboard layout 502 via the layout editor for the designer to create and modify the dashboard definition 106. Editing the dashboard definition 106 includes editing one or more visualization definitions 124 defining the visualization panels 520, where each visualization panel 520 includes one or more visualizations 130. The layout editor also enables the designer to place one or more selectable menus 510 within the dashboard layout 502. The selectable menu 510 enables end users to interact with the dashboard 110 by specifying certain filters, such as filters that the dashboard rendering framework 108 uses to set the range of field values that the visualization panels 520 are to display.

In various implementations, when generating the visualization panels 520 for the dashboard layout 502, the designer creates multiple searches that retrieve field values from data stored in the indexing system. In such instances, the designer uses the visualization editor to specify parameters for how a given visualization panel 520 uses the field values when displaying information to the end user.

For example, the dashboard layout 502 includes five textual visualization panels 520(1)-520(5) that display text strings of retrieved field values or include values generated from the analysis of field values. The field values are retrieved upon the dynamic data source 160 transmitting one or more of the searches listed in the search list 504 to the data intake and query system 180. The dashboard layout 502 also includes two graphical visualization panels 520(6)-520(7) that display charts (e.g., a bar chart 522, a donut chart 524) reflecting the field values received in response to the data intake and query system 180 executing one or more of the searches listed in the search list 504.

In various implementations, the designer selects the edit option 530 to edit one of the searches in the search list 504. As will be discussed in further detail below, selecting the edit option 530 causes the dashboard editor 214 to edit parameters of the search query, including the parameters of the one or more data sources that is to be searched when the data intake and query system 180 executes the corresponding search query 302. As will be discussed further below, the data source editor enables a designer to edit query parameters, such as the field values that are to be retrieved, for one or more of the search queries that are associated with the data source.

Figure 6:
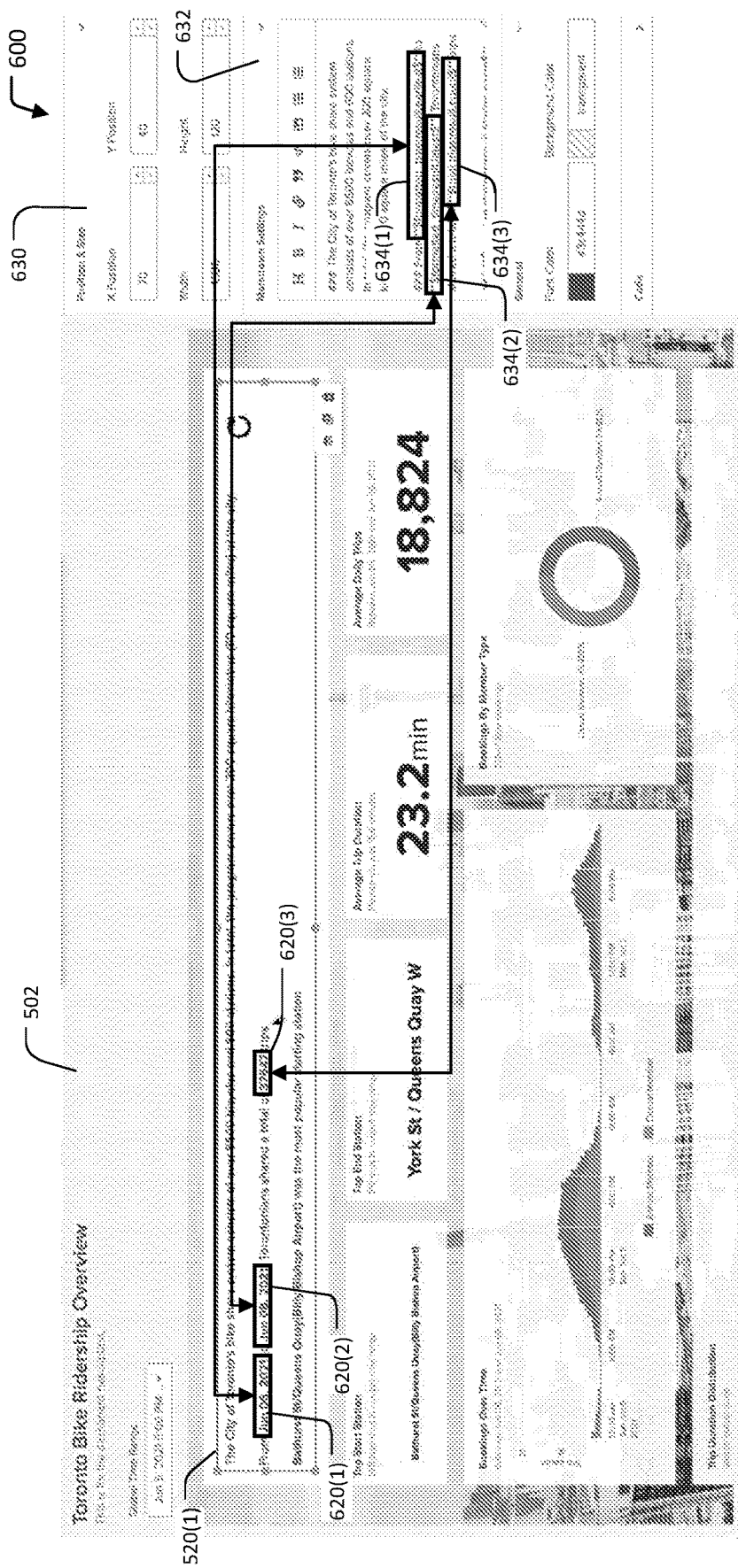
FIG. 6 is an example dashboard included in the network architecture of FIG. 1 and a visualization editor, in accordance with example implementations.

FIG. 6 is an example dashboard 600 included in the network architecture 100 of FIG. 1 and a visualization editor 630, in accordance with example implementations. Dashboard 600 includes, without limitation, the dashboard layout 502, and the visualization editor 630. The visualization editor 630 includes a markup window 632 and search results tokens 634. The dashboard layout 502 includes the visualization panel 520(1). The visualization panel 520(1) includes field values 620.

In operation, the dashboard editor 214 provides the visualization editor 630 to enable the designer to edit the contents of a given visualization panel 520 in the dashboard layout 502. The dashboard editor 214 saves changes to the visualization panel 520 by updating the visualization definition 124 and/or other definitions 122-128 included in the dashboard definition 106. In such instances, the dashboard rendering framework 108 processes the updated dashboard definition 106 to render a dashboard 110 that includes the updated visualization panel 520.

In some implementations, the visualization editor 630 enables the designer to add one or more smart source tokens 310 to portions of the visualization panel 520(1). Adding a given smart source token 310 to the visualization panel 520(1) represents corresponding data values that are to be retrieved by the data intake and query system 180 when the dashboard rendering framework 108 renders the dashboard 110.

In various implementations, a portion of the visualization panel 520(1) includes a given smart source token 310 representing data that the visualization 130 is to display. In some implementations, the visualization editor 630 generates a visualization definition for the visualization panel 520(1) that includes the contents of the markup window 632, including the search results tokens 634(1)-634(3). For example, the visualization editor 630 contains a markup window 632 that includes the text that visualization panel 520(1) is to display when rendered. The text includes three search results tokens 634(1)-634(3) that respectively represent distinct fields for which field values are retrieved when the data intake and query system 180 executes the applicable search queries 302. In the example, the data intake and query system 180 executes "formatted time" search query to retrieve field values corresponding to the search results tokens 634(1), 634(2), while executing a "total trips" search query to retrieve field values corresponding to the search results token 634(3)).

When the dashboard rendering framework 108 processes the visualization definition to render the visualization panel 520(1), the dashboard rendering framework 108 sends a request to the dynamic data source 160 to execute the respective search queries 302. The dynamic data source 160 transmits one or more messages to the data intake and query system 180 requesting execution of the respective embedded search queries 302. When the data intake and query system 180 executes the respective search queries 302, the dynamic data source 160 receives the field values. The search event handler 142 identifies the field values as being associated with the execution of the search queries 302 and causes the token management system 150 to update the smart source tokens 310 with the corresponding applicable field value set 432. The token management system 150 generates an event 422 including the field values and transmits the event 422 to the dashboard rendering framework 108. The dashboard rendering framework 108 uses the content of the event 422 to perform substitutions for the smart source tokens included in the visualization definition. For example, the dashboard rendering framework 108 substitutes the field values 620(1)-620(3) included in the field value set 432 that correspond to the search results tokens 634(1)-634(3) included in the visualization definition. The dashboard rendering framework 108 renders the visualization panel 520(1) to include the field values 620(1)-620(3) at the locations within the text as specified by the visualization definition.

In some implementations, the visualization definition 124 for the visualization panel 520(1) includes additional code that specifies contents of the visualization panel 520(1). In such instances, the designer can use the visualization editor 630 to add code to the visualization definition 124 to manage the contents of the visualization panel 520(1). For example, the visualization definition 124 for the visualization panel 520(1) can include code specifying that the visibility of the visualization panel 520(1) is conditional on one or more metadata values associated with the search event (e.g., a "search status done" metadata value having a Boolean value of 'Y' and a "result count" metadata value exceeding a minimum threshold quantity). In such instances, the dashboard rendering framework 108 processes the visualization definition 124 specifying the parameters for the visualization panel 520(1) by rendering the visualization panel 520(1) as not visible within the dashboard 110 until all of the conditions specified for visibility are met.

Figure 7:
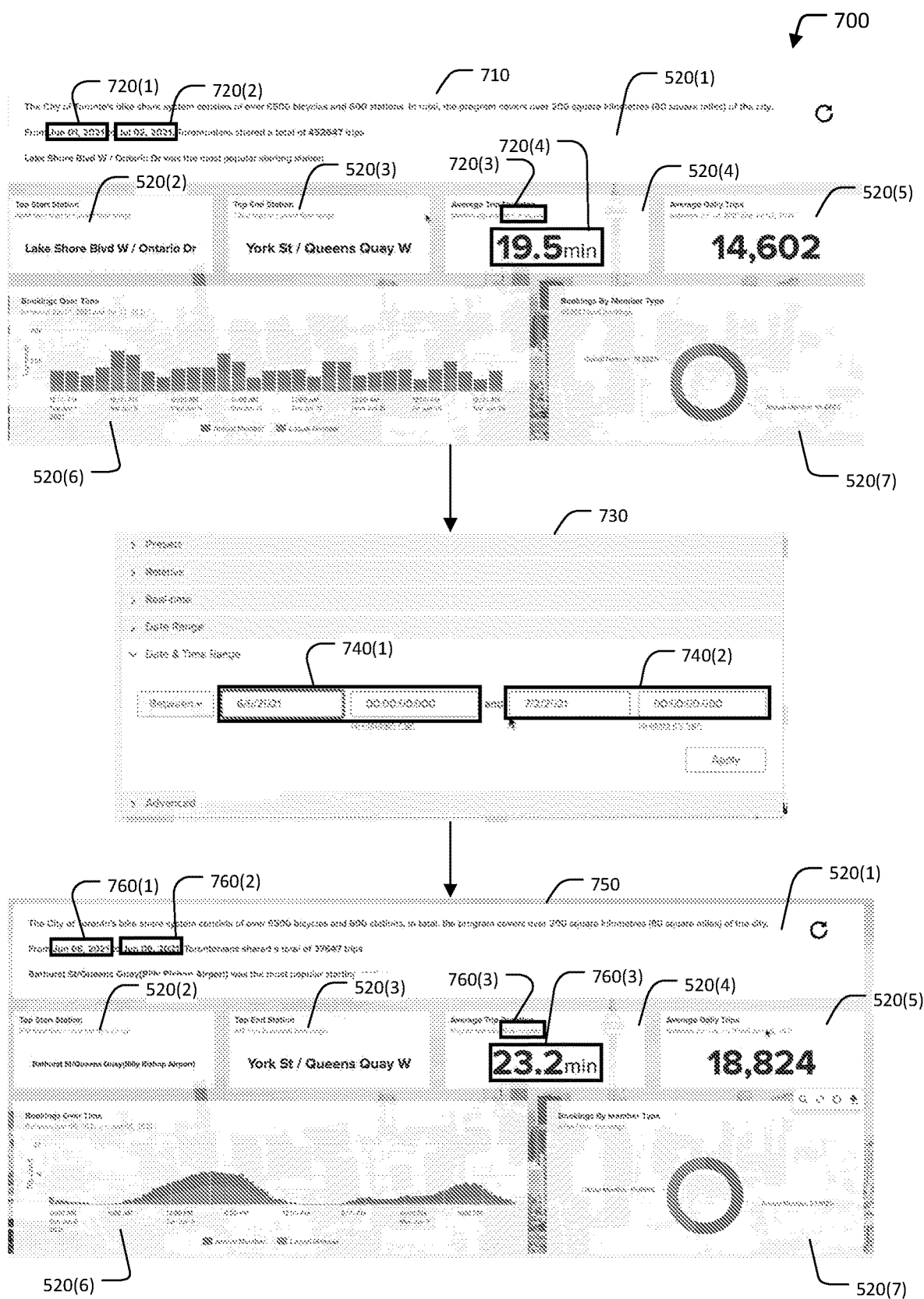
FIG. 7 illustrates an example sequence of the dashboard included in the network architecture of FIG. 1 updating to an updated dashboard to reflect different search query parameters, in accordance with example implementations.

FIG. 7 illustrates an example sequence 700 of the dashboard 710 included in the network architecture 100 of FIG. 1 updating to an updated dashboard 750 to reflect different search query parameters, in accordance with example implementations. As shown, the sequence 700 includes, without limitation, a first dashboard 710, a query parameter menu 730, and an updated dashboard 750. The first dashboard 710 includes, without limitation, visualization panels 520 and data values 720. The query parameter menu 730 includes search query parameter fields 740. The updated dashboard 750 includes updated data values 760.

In various implementations, the dashboard rendering framework 108 provides the first dashboard 710 including the visualization panels 520(1)-520(7). The dashboard rendering framework 108 also provides the query parameter menu 730 to enable the end user to interact with the dashboard 710 by specifying parameters that the dashboard rendering framework 108 uses to filter the data values that the dashboard presents.

For example, the visualization panel 520(1) displays the date range of the set of events from which data was extracted to be included in the first dashboard 710 using the data values 720(1)-720(2). As shown, visualization panel 520(1) displays text indicating that data generated from events occurring within the date range between the start date 720(1) ("Jun. 1, 2021") and the end date 720(2) ("Jul. 2, 2021"). The visualization panels 520(2)-520(7) within the first dashboard 710 show various data values extracted from events occurring within the date range.

For example, the visualization panel 520(4) displays a median trip time data value 720(3) that the dashboard rendering framework 108 computes from determining a median for the set of trip times that occurred within the specific date range. The visualization panel 520(4) further includes an average trip duration data value 720(4) that the dashboard rendering framework 108 computes from determining a mean for the set of trip times that occurred within the specific date range.

In various implementations, the end user enters one or more inputs into the query parameter menu 730 to specify one or more query parameters associated with the data that the first dashboard 710 is displaying. For example, the query parameter menu includes a date and time range section that includes fields for the end user to enter specific date and time-of-day inputs, including a start date and time input 740(1) and an end date and time input 740(2). Upon entering and applying the inputs, the dashboard rendering framework 108 responds to the inputs by rendering the updated dashboard 750. In some implementations, the dashboard rendering framework 108 has previously received the relevant field values and responds to the inputs by filtering the set of field values based on the inputted query parameters. Additionally or alternatively, in some implementations, the dashboard rendering framework 108 responds to the inputted query parameters by sending new requests to the data intake and query system 180 to execute the corresponding embedded search queries 302 based on the updated query parameters.

For example, the end user can update the search query parameters by updating the start date input 740(1) from "Jun. 1, 2021" to "Jun. 6, 2021" and the end date input "Aug. 1, 2021" to "Jun. 8, 2021." In such instances, the dashboard rendering framework 108 renders the updated dashboard 108 by filtering the data set to a set of field values extracted from events occurring within the more-limited date range. In such instances, the dashboard rendering framework updates each of the visualization panels 520(1)-520(7) to reflect the data from the updated date range. As shown, the updated median trip time data value 760(3) determined for the 5-day date range differs from the median trip time data value 720(3) determined for the month-long date range, computes from determining a median for the set of trip times that occurred within the specific date range. Similarly, the updated average trip time data value 760(4) determined for the 5-day date range differs from the average trip time data value 720(4) determined for the month-long date range.

In some implementations, the dashboard rendering framework 108 can render the contents of a visualization 520(6) differently based on the query parameters. For example, the dashboard rendering framework 108 renders the visualization 520(6) in the first dashboard 710 as a bar graph representing daily bookings over the month-long date range. When the dashboard rendering framework 108 renders the updated dashboard 750, the dashboard rendering framework 108 changes the axes of the chart to display bookings over specific time ranges within the 5-day date range.

Additionally or alternatively, in some implementations, the dashboard rendering framework 108 renders the updated dashboard 750 in response to receiving additional events 422 provided by the token management system 150. In various implementations, the token management system 150 updates the data values for one or more smart source tokens 310 as the execution of one or more search queries 302 continues. Upon receiving additional data, the token management system 150 sets the smart search tokens 310 included in the first dashboard 710 based on the additional data.

Figure 8:
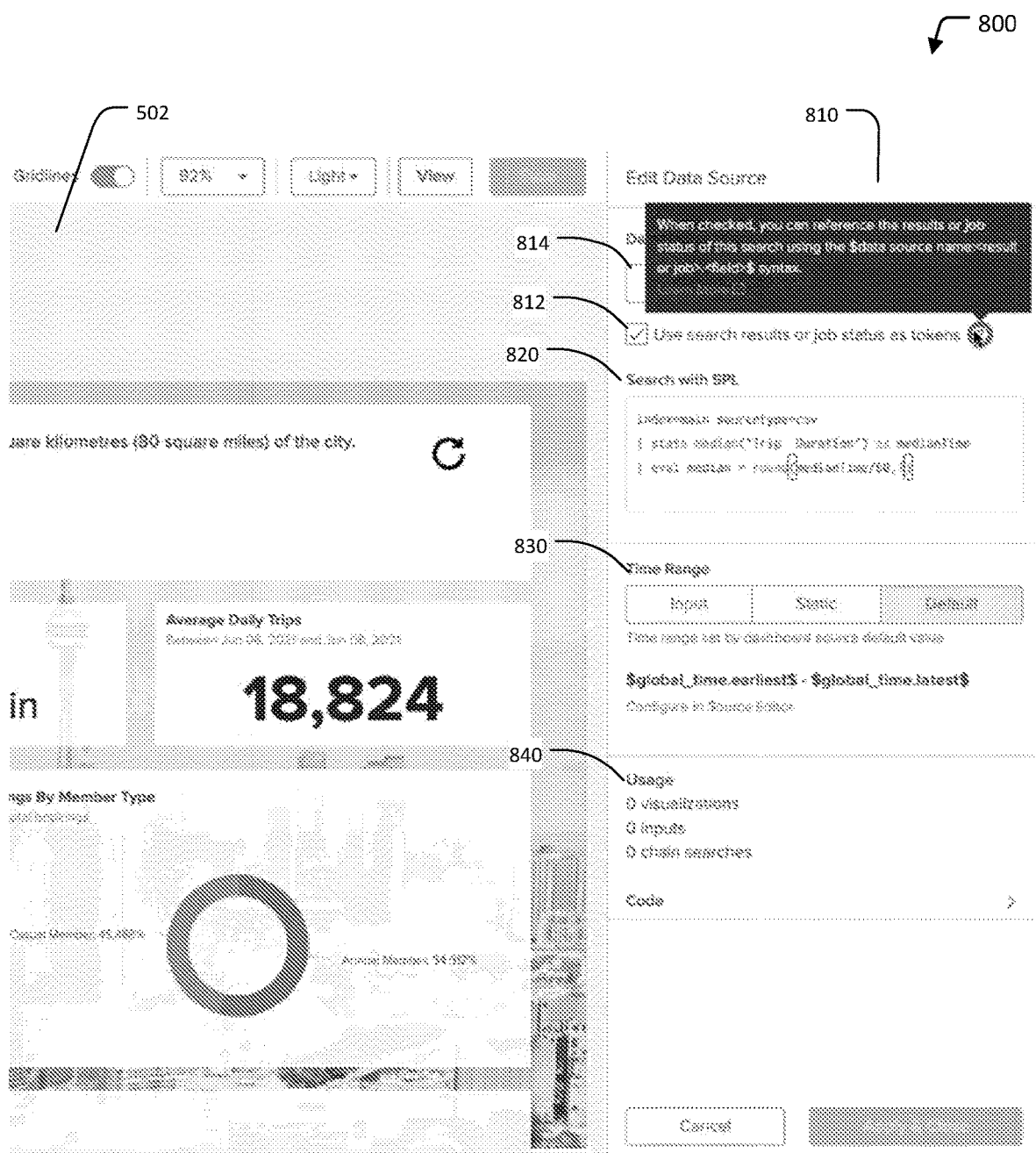
FIG. 8 illustrates an example dashboard included in the network architecture of FIG. 1 and an editor for a data source, in accordance with example implementations.

FIG. 8 illustrates an example dashboard 800 included in the network architecture 100 of FIG. 1 and an editor 810 for a data source, in accordance with example implementations. As shown, the dashboard 800 includes, without limitation, a dashboard layout 502 and the data source editor 810. The data source editor 810 includes a smart source selection checkbox 812, a data source name field 814, a search query field 820, a time range field 730, and a usage field 840.

In operation, the dashboard editor 214 provides the data source editor 830 for the designer to edit the search definitions 122 for one or more search queries 302. The search queries are to be executed by the dynamic data source 160 transmitting data requests to the data intake and query system 180, where the requests trigger the data intake and query system 180 to retrieve specific field values from data generated by one or more data sources. In various implementations, the data source editor 830 includes input fields to identify specific data sources that produce the relevant data that is to be retrieved within the data intake and query system 180. In such instances, the data intake and query system 180 executes the search query 302 based on the query parameters specified in the search definition (and modified via the data source editor 810) in order to extract field values from the stored data.

The data source editor 810 includes a data source name input field 814. In some implementations, the data source name corresponds to the name of the embedded search query. For example, a "medianTime" data source name identifies the specific embedded search query 302 that the dynamic data source 160 is to send to the data intake and query system 180 in order for the client device 102 to retrieve field values for the "trip duration" field that the dashboard rendering framework 108 uses to compute the "medianTime" data value.

The smart source selection checkbox 812 is a selectable checkbox that enables the search event handler 142 and/or the token management system 150 to generate smart source tokens 310 for the search queries 302 corresponding to the data source. As shown, the notification window indicates that selection of the smart source tokens 310 enables the designer to add smart source tokens 310 to visualization definitions in order to reference the search results or metadata for the execution of the search by adding specific syntax signifying the smart source token 310.

The search query field 820 enables the designer to input one or more query parameters associated with the embedded search query 302 corresponding to the data source. For example, the designer can specify the type of data source, the field values that are to be extracted, and how the field values are used. For example, as shown, the designer specifies that the medianTime data value is computed by the dynamic data source 160 retrieving a set of field values for the "trip duration" field and determining the median for the retrieved set of field values.

The time range field 730 specifies the time range of events that are to be searched when extracting the specified field values. For example, when using the default time range, the dynamic data source 160 transmits to the data intake and query system 180 a search query requesting the extraction of field values for the "trip duration" field from the entire range of events stored in the field-searchable data store corresponding to the data source identified in the search query. In some implementations, the designer can specify different time ranges for the events. For example, the designer can input a dynamic time range that is selectable by the end user, or alternatively, can specify a static time range.

The usage field 840 provides statistics about how a given dashboard layout 502 uses the data source. For example, when the designer includes the smart source tokens 310 for the specific embedded search query 302 in one or more of the visualizations 520 included in the dashboard layout 502, the dashboard editor 214 updates the usage field 840 to indicate the number of visualizations that reference the search query 302. Additionally or alternatively, the usage field 840 includes other usage statistics, such as the quantity of times that the embedded search query 302 is used as an input or included in a chain search by a portion of the dashboard 110.

Figure 9:
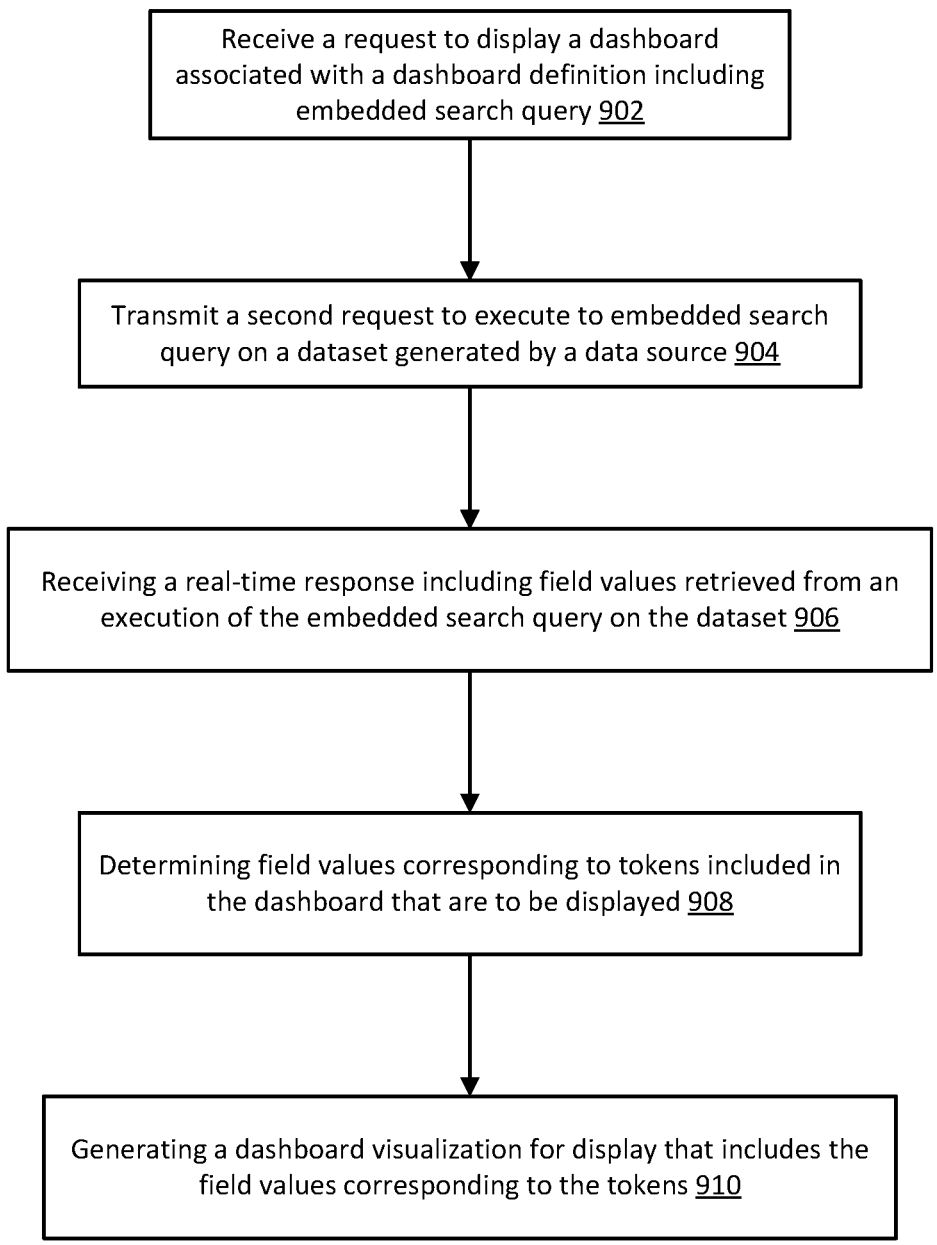
FIG. 9 is a flowchart illustrating an example process for the client device to render a dashboard using a dashboard definition, in accordance with example implementations.

FIG. 9 is a flowchart illustrating an example process for the client device 102 to render a dashboard 110 using a dashboard definition 106, in accordance with example implementations. Although the method steps are described in conjunction with FIGS. 1-8, persons of ordinary skill in the art will understand that any system configured to perform this method and/or other methods described herein, in any order, and in any combination not logically contradicted, is within the scope of the present invention.

The example process 900 can be implemented, for example, by a computing device that comprises a processor and a non-transitory computer-readable medium. The non-transitory computer readable medium can be storing instructions that, when executed by the processor, can cause the processor to perform the operations of the illustrated process 900. Alternatively or additionally, the process 900 can be implemented using a non-transitory computer-readable medium storing instructions that, when executed by one or more processors, cause the one or more processors to perform the operations of the process 900 of FIG. 9.

As shown by method 900, at step 902, the client device 102 receives a request to display a dashboard 110 associated with a dashboard definition 106. In various implementations, a dashboard rendering framework 108 included in the client device 102 receives an input requesting that the dashboard 110 be rendered. In some implementations, the request is a manual input provided by an end user. Additionally or alternatively, in some implementations, the request is a periodic message to trigger the dashboard rendering framework 108 to refresh a previously-rendered dashboard 110.

At step 904, the client device 102 transmits a second request to execute an embedded search query. In various implementations, the dashboard rendering framework 108 responds to the request by processing the dashboard definition 106 associated with the dashboard 106. The dashboard definition 106 includes one or more definitions 122-128 specifying how portions of the dashboard 110 are to be rendered. In some implementations, the search definition 122 includes one or more search queries 302 that are to retrieve data generated by the specified data sources. In various implementations, the dashboard rendering framework 108 retrieves the embedded search query 302 from the dashboard definition 106 for the dashboard 110 that is to be rendered. In some implementations, the dashboard rendering framework 108 also retrieves information about the data source producing the data that is to be searched. Portions of the search query and the execution search query are represented by one or more smart source tokens 310 included in the definitions 122-128, where a given smart source token 310 represents a specific data or metadata value. In some implementations, the data sources identified in the search queries 302 generate data that is indexed and stored as unstructured data in portions of one or more field-searchable data stores.

In some implementations, the dashboard rendering framework 108 sends the search queries to the dynamic data store 160, where the dynamic data store 160 manages the retrieval of the data by transmitting the search queries 302 to the data intake and query system 180. In such instances, the search event handler 142 tokenizes the search query 302 by generating a set of smart source tokens 310 associated with the execution of the search query 302. In some implementations, the search event handler 142 transmits the set of smart source tokens 310 to the token management system 150, where the queue manager 144 adds the smart source tokens 310 to the queue 146. Upon adding the smart source tokens 310 to the queue 146, the queue manager 144 sequentially sets each of the smart source tokens 310 included in the queue 146. In various implementations, the data intake and query system 180 executes the embedded search query 302 to extract an applicable set of field values from the data stored in the indexing system. In some implementations, the embedded search query 302 identifies multiple data sources. In such instances, the data intake and query system 180 can execute the applicable portions of the embedded search query 302 on each of the identified data sources.

At step 906, the client device 102 receives a real-time response that includes field values retrieved from an execution of the embedded search query on the data source. In various implementations, the dynamic data source 160 receives data values that are provided by the data intake and query system 180.

In some implementations, the event system 140 identifies data handled by the dynamic data source 160 as associated with the execution of the embedded search query 302. In various implementations, the data includes a set of field values that the data intake and query system 180 extracted from the data stored in the indexing system. Additionally or alternatively, the data includes metadata values that correspond lifecycle events associated with the execution of the search query 302. In various implementations, the token management system 150 updates one or more of the smart source tokens 310 based on the data that the dynamic data source 160 is handling.

At step 908, the client device 102 determines field values corresponding to tokens included in the dashboard that are to be displayed. In various implementations, the dashboard rendering framework 108 receives an event 422 based on the token management system 150 updating one or more smart source tokens 310 with field values received by the dynamic data source 160. In such instances, the dashboard rendering framework determines whether the event 422 includes field values represented by a smart source token 310 in at least one visualization definition 124 included in the dashboard definition 106. In some implementations, the dashboard rendering framework 108 checks each visualization definition 124 for smart source tokens 310 and determines whether the event 422 includes any field values that correspond to the smart source tokens 310 has been received. When the dashboard rendering framework 108 determines that the event 422 includes one or more applicable field values, the dashboard rendering framework 108 substitutes the smart source tokens 310 with the corresponding field values at the applicable locations within the visualization definition 124.

At step 910, the client device 102 generates a dashboard visualization for display that includes the field values corresponding to the tokens. In various implementations, upon identifying the applicable field values, the dashboard production framework 108 renders the dashboard 110, including the additional field values in the one or more visualizations 130.

In some implementations, the visualization definition 124 for the visualization panel 520(1) includes additional code that specifies contents of the visualization panel 520(1). In such instances, the designer of the dashboard 110 can use the visualization editor 630 to manage the appearance of the visualization when rendered by the dashboard rendering framework 108. For example, the designer can add code to the visualization definition 124 to manage the contents of the visualization panel 520(1). In one example, the visualization definition 124 for the visualization panel 520(1) can include code specifying that the visibility of the visualization panel 520(1) is conditional on one or more metadata values associated with the search event (e.g., a "search status done" metadata value having a Boolean value of 'Y' and a "result count" metadata value exceeding a minimum threshold quantity). In such instances, the dashboard rendering framework 108 process the visualization definition 124 for the visualization panel 520(1) by making the visualization panel 520(1) not visible within the dashboard 110 until all of the conditions specified for visibility are met.

In various implementations, the token management system 150 periodically updates the field value set 432 and/or the metadata value set 434 based on the updated data handled by the dynamic data source 160 and identified by the search event handler 142. In such instances, updates made by the token management system 150 to the search values 430 can cause the dashboard rendering framework 108 to update the rendering of the dashboard 110. For example, the dashboard rendering framework 108 can receive an additional event 442 that includes updated values from the field value set 432. In such instances, the dashboard rendering framework 108 can respond to the event 422 by updating the dashboard 110 to include the additional field values included in the updated field value set 432.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 10:
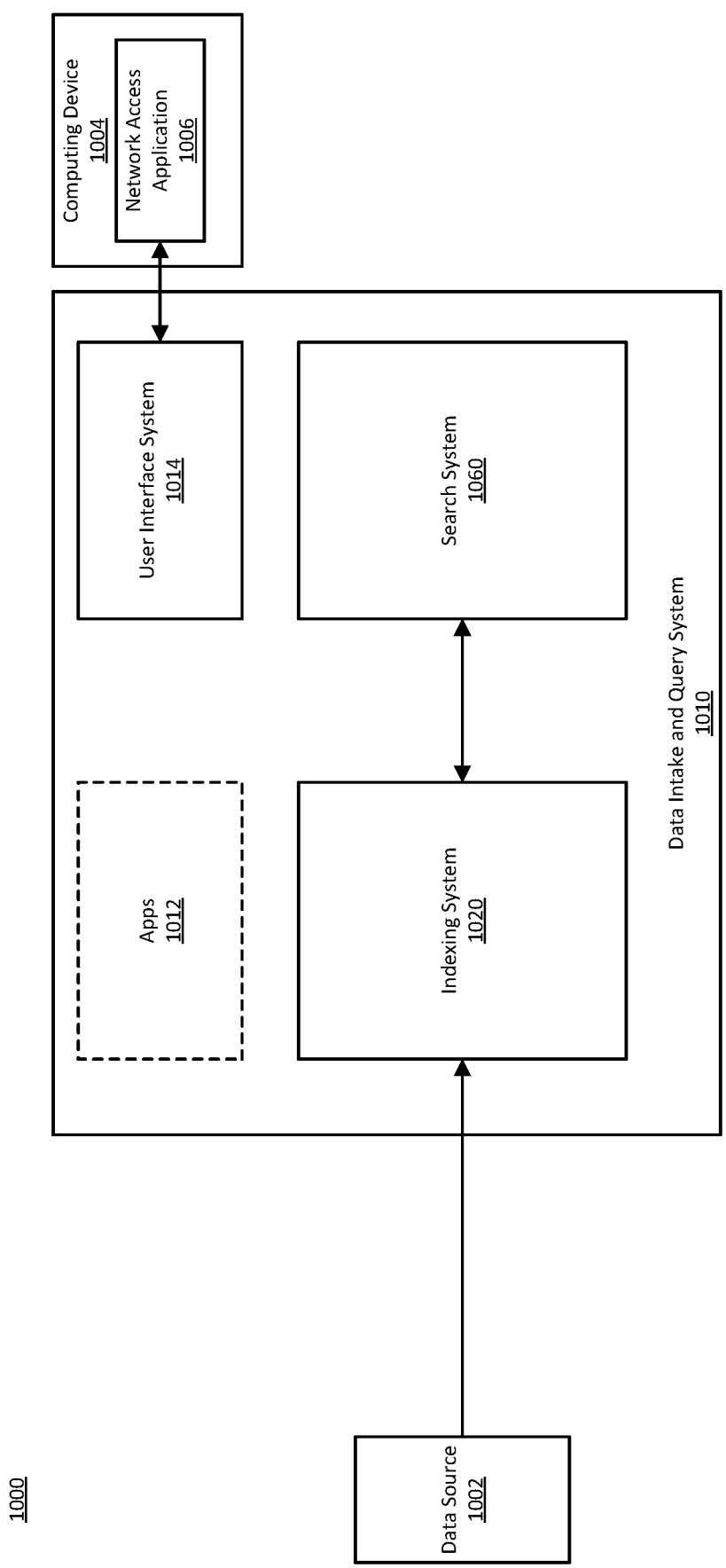
FIG. 10 is a block diagram illustrating an example computing environment that includes a data intake and query system.

FIG. 10 is a block diagram illustrating an example computing environment 1000 that includes a data intake and query system 1010. The data intake and query system 1010 obtains data from a data source 1002 in the computing environment 1000, and ingests the data using an indexing system 1020. A search system 1060 of the data intake and query system 1010 enables users to navigate the indexed data. Though drawn with separate boxes in FIG. 10, in some implementations the indexing system 1020 and the search system 1060 can have overlapping components. A computing device 1004, running a network access application 1006, can communicate with the data intake and query system 1010 through a user interface system 1014 of the data intake and query system 1010. Using the computing device 1004, a user can perform various operations with respect to the data intake and query system 1010, such as administration of the data intake and query system 1010, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1010 can further optionally include apps 1012 that extend the search, analytics, and/or visualization capabilities of the data intake and query system 1010.

The data intake and query system 1010 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1010 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1010 can be executed on a single computing device, or execution of the program code can be distributed over multiple computing devices. For example, the program code can include instructions for both indexing and search components (which may be part of the indexing system 1020 and/or the search system 1060, respectively), which can be executed on a computing device that also provides the data source 1002. As another example, the program code can be executed on one computing device, where execution of the program code provides both indexing and search components, while another copy of the program code executes on a second computing device that provides the data source 1002. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1002 of the computing environment 1000 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1002 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1020 obtains machine date from the data source 1002 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1020 does not require prior knowledge of the structure of incoming data (e.g., the indexing system 1020 does not need to be provided with a schema describing the data). Additionally, the indexing system 1020 retains a copy of the data as it was received by the indexing system 1020 such that the original data is always available for searching (e.g., no data is discarded, though, in some examples, the indexing system 1020 can be configured to do so).

The search system 1060 searches the data stored by the indexing 1020 system. As discussed in greater detail below, the search system 1060 enables users associated with the computing environment 1000(and possibly also other users) to navigate the data, generate reports, and visualize search results in "dashboards" output using a graphical interface. Using the facilities of the search system 1060, users can obtain insights about the data, such as retrieving events from an index, calculating metrics, searching for specific conditions within a rolling time window, identifying patterns in the data, and predicting future trends, among other examples. To achieve greater efficiency, the search system 1060 can apply map-reduce methods to parallelize searching of large volumes of data. Additionally, because the original data is available, the search system 1060 can apply a schema to the data at search time. This allows different structures to be applied to the same data, or for the structure to be modified if or when the content of the data changes. Application of a schema at search time may be referred to herein as a late-binding schema technique.

The user interface system 1014 provides mechanisms through which users associated with the computing environment 1000(and possibly others) can interact with the data intake and query system 1010. These interactions can include configuration, administration, and management of the indexing system 1020, initiation and/or scheduling of queries that are to be processed by the search system 1060, receipt or reporting of search results, and/or visualization of search results. The user interface system 1014 can include, for example, facilities to provide a command line interface or a web-based interface.

Users can access the user interface system 1014 using a computing device 1004 that communicates with data intake and query system 1010, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1000. For example, a person can log in as a particular user and, using the user's digital information, can access the data intake and query system 1010. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1004 can provide a human-machine interface through which a person can have a digital presence in the computing environment 1000 in the form of a user. The computing device 1004 is an electronic device having one or more processors and a memory capable of storing instructions for execution by the one or more processors. The computing device 1004 can further include input/output (I/O) hardware and a network interface. Applications executed by the computing device 1004 can include a network access application 1006, such as a web browser, which can use a network interface of the client computing device 1004 to communicate, over a network, with the user interface system 1014 of the data intake and query system #A110. The user interface system 1014 can use the network access application 1006 to generate user interfaces that enable a user to interact with the data intake and query system #A110. A web browser is one example of a network access application. A shell tool can also be used as a network access application. In some examples, the data intake and query system 1010 is an application executing on the computing device 1006. In such examples, the network access application 1006 can access the user interface system 1014 without going over a network.

The data intake and query system 1010 can optionally include apps 1012. An app of the data intake and query system 1010 is a collection of configurations, knowledge objects (a user-defined entity that enriches the data in the data intake and query system 1010), views, and dashboards that may provide additional functionality, different techniques for searching the data, and/or additional insights into the data. The data intake and query system 1010 can execute multiple applications simultaneously. Example applications include an information technology service intelligence application, which can monitor and analyze the performance and behavior of the computing environment 1000, and an enterprise security application, which can include content and searches to assist security analysts in diagnosing and acting on anomalous or malicious behavior in the computing environment 1000.

Though FIG. 10 illustrates only one data source, in practical implementations, the computing environment 1000 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1000, the data intake and query system 1010 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1000 can include on-prem and cloud-based computing resources, or only cloud-based resources. For example, an entity may have on-prem computing devices and a private cloud. In this example, the entity operates the data intake and query system 1010 and can choose to execute the data intake and query system 1010 on an on-prem computing device or in the cloud. In another example, a provider entity operates the data intake and query system 1010 in a public cloud and provides the functionality of the data intake and query system 1010 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1010. In some implementations, the entity providing the data intake and query system 1010 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1010, and a third entity can subscribe to the services of the second provider entity in order to use the functionality of the data intake and query system 1010. In this example, the data sources are associated with the third entity, users accessing the data intake and query system 1010 are associated with the third entity, and the analytics and insights provided by the data intake and query system 1010 are for purposes of the third entity's operations.

Figure 11:
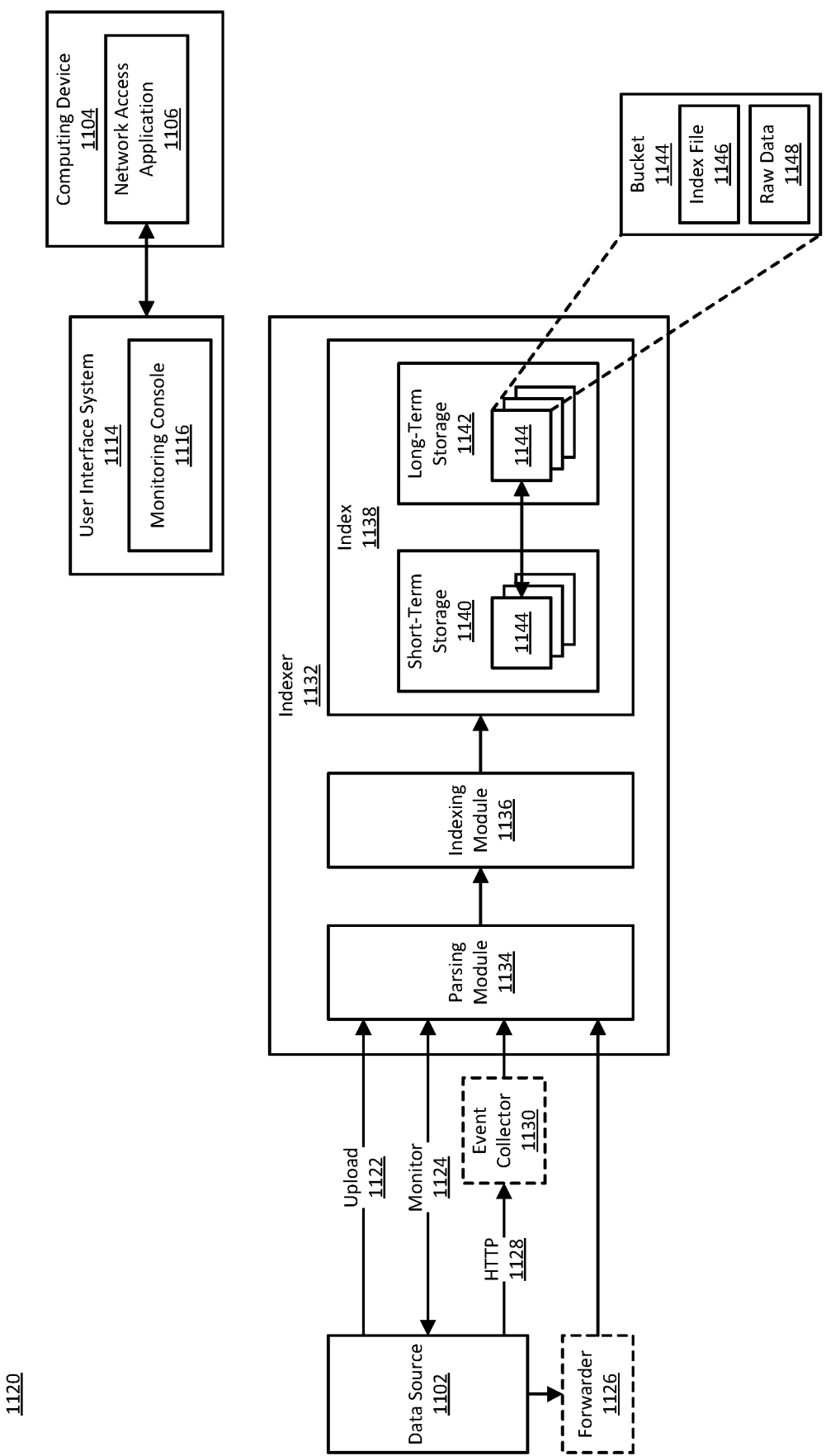
FIG. 11 is a block diagram illustrating in greater detail an example of an indexing system of a data intake and query system, such as the data intake and query system of FIG. 10.

FIG. 11 is a block diagram illustrating in greater detail an example of an indexing system 1120 of a data intake and query system, such as the data intake and query system 1010 of FIG. 10. The indexing system 1120 of FIG. 11 uses various methods to obtain machine data from a data source 1102 and stores the data in an index 1138 of an indexer 1132. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1120 enables the data intake and query system to obtain the machine data produced by the data source 1102 and to store the data for searching and retrieval.

Users can administer the operations of the indexing system 1120 using a computing device 1104 that can access the indexing system 1120 through a user interface system 1114 of the data intake and query system. For example, the computing device 1104 can be executing a network access application 1106, such as a web browser or a terminal, through which a user can access a monitoring console 1116 provided by the user interface system 1114. The monitoring console 1116 can enable operations such as: identifying the data source 1102 for data ingestion; configuring the indexer 1132 to index the data from the data source 1132; configuring a data ingestion method; configuring, deploying, and managing clusters of indexers; and viewing the topology and performance of a deployment of the data intake and query system, among other operations. The operations performed by the indexing system 1120 may be referred to as "index time" operations, which are distinct from "search time" operations that are discussed further below.

The indexer 1132, which may be referred to herein as a data indexing component, coordinates and performs most of the index time operations. The indexer 1132 can be implemented using program code that can be executed on a computing device. The program code for the indexer 1132 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1132. In some implementations, the indexer 1132 executes on the computing device 1104 through which a user can access the indexing system 1120. In some implementations, the indexer 1132 executes on a different computing device than the illustrated computing device 1104.

The indexer 1132 may be executing on the computing device that also provides the data source 1102 or may be executing on a different computing device. In implementations wherein the indexer 1132 is on the same computing device as the data source 1102, the data produced by the data source 1102 may be referred to as "local data." In other implementations the data source 1102 is a component of a first computing device and the indexer 1132 executes on a second computing device that is different from the first computing device. In these implementations, the data produced by the data source 1102 may be referred to as "remote data." In some implementations, the first computing device is "on-prem" and in some implementations the first computing device is "in the cloud." In some implementations, the indexer 1132 executes on a computing device in the cloud and the operations of the indexer 1132 are provided as a service to entities that subscribe to the services provided by the data intake and query system.

For a given data produced by the data source 1102, the indexing system 1120 can be configured to use one of several methods to ingest the data into the indexer 1132. These methods include upload 1122, monitor 1124, using a forwarder 1126, or using HyperText Transfer Protocol (HTTP 1128) and an event collector 1130. These and other methods for data ingestion may be referred to as "getting data in" (GDI) methods.

Using the upload 1122 method, a user can specify a file for uploading into the indexer 1132. For example, the monitoring console 1116 can include commands or an interface through which the user can specify where the file is located (e.g., on which computing device and/or in which directory of a file system) and the name of the file. The file may be located at the data source 1102 or maybe on the computing device where the indexer 1132 is executing. Once uploading is initiated, the indexer 1132 processes the file, as discussed further below. Uploading is a manual process and occurs when instigated by a user. For automated data ingestion, the other ingestion methods are used.

The monitor 1124 method enables the indexing system 1102 to monitor the data source 1102 and continuously or periodically obtain data produced by the data source 1102 for ingestion by the indexer 1132. For example, using the monitoring console 1116, a user can specify a file or directory for monitoring. In this example, the indexing system 1102 can execute a monitoring process that detects whenever the file or directory is modified and causes the file or directory contents to be sent to the indexer 1132. As another example, a user can specify a network port for monitoring. In this example, a monitoring process can capture data received at or transmitting from the network port and cause the data to be sent to the indexer 1132. In various examples, monitoring can also be configured for data sources such as operating system event logs, performance data generated by an operating system, operating system registries, operating system directory services, and other data sources.

Monitoring is available when the data source 1102 is local to the indexer 1132 (e.g., the data source 1102 is on the computing device where the indexer 1132 is executing).

Other data ingestion methods, including forwarding and the event collector 1130, can be used for either local or remote data sources.

A forwarder 1126, which may be referred to herein as a data forwarding component, is a software process that sends data from the data source 1102 to the indexer 1132. The forwarder 1126 can be implemented using program code that can be executed on the computer device that provides the data source 1102. A user launches the program code for the forwarder 1126 on the computing device that provides the data source 1102. The user can further configure the forwarder 1126, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1126 can provide various capabilities. For example, the forwarder 1126 can send the data unprocessed or can perform minimal processing on the data before sending the data to the indexer 1132. Minimal processing can include, for example, adding metadata tags to the data to identify a source, source type, and/or host, among other information, dividing the data into blocks, and/or applying a timestamp to the data. In some implementations, the forwarder 1126 can break the data into individual events (event generation is discussed further below) and send the events to a receiver. Other operations that the forwarder 1126 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1130 provides an alternate method for obtaining data from the data source 1102. The event collector 1130 enables data and application events to be sent to the indexer 1132 using HTTP 1128. The event collector 1130 can be implemented using program code that can be executing on a computing device. The program code may be a component of the data intake and query system or can be a standalone component that can be executed independently of the data intake and query system and operates in cooperation with the data intake and query system.

To use the event collector 1130, a user can, for example using the monitoring console 1116 or a similar interface provided by the user interface system 1114, enable the event collector 1130 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1102 as an alternative method to using a username and password for authentication.

To send data to the event collector 1130, the data source 1102 is supplied with a token and can then send HTTP 1128 requests to the event collector 1130. To send HTTP 1128 requests, the data source 1102 can be configured to use an HTTP client and/or to use logging libraries such as those supplied by Java, JavaScript, and .NET libraries. An HTTP client enables the data source 1102 to send data to the event collector 1130 by supplying the data, and a Uniform Resource Identifier (URI) for the event collector 1130 to the HTTP client. The HTTP client then handles establishing a connection with the event collector 1130, transmitting a request containing the data, closing the connection, and receiving an acknowledgment if the event collector 1130 sends one. Logging libraries enable HTTP 1128 requests to the event collector 1130 to be generated directly by the data source. For example, an application can include or link a logging library, and through functionality provided by the logging library manage establishing a connection with the event collector 1130, transmitting a request, and receiving an acknowledgement.

An HTTP 1128 request to the event collector 1130 can contain a token, a channel identifier, event metadata, and/or event data. The token authenticates the request with the event collector 1130. The channel identifier, if available in the indexing system 1120, enables the event collector 1130 to segregate and keep separate data from different data sources. The event metadata can include one or more key-value pairs that describe the data source 1102 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1130 extracts events from HTTP 1128 requests and sends the events to the indexer 1132. The event collector 1130 can further be configured to send events to one or more indexers. Extracting the events can include associating any metadata in a request with the event or events included in the request. In these implementations, event generation by the indexer 1132 (discussed further below) is bypassed, and the indexer 1132 moves the events directly to indexing. In some implementations, the event collector 1130 extracts event data from a request and outputs the event data to the indexer 1132, and the indexer generates events from the event data. In some implementations, the event collector 1130 sends an acknowledgement message to the data source 1102 to indicate that the event collector 1130 has received a particular request form the data source 1102, and/or to indicate to the data source 1102 that events in the request have been added to an index.

The indexer 1132 ingests incoming data and transforms the data into searchable knowledge in the form of events. In the data intake and query system, an event is a single piece of data that represents activity of the component represented in FIG. 11 by the data source 1102. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1132 can include a parsing module 1134 and an indexing module 1136 for generating and storing the events. The parsing module 1134 and indexing module 1136 can be modular and pipelined, such that one component can be operating on a first set of data while the second component is simultaneously operating on a second sent of data. Additionally, the indexer 1132 may at any time have multiple instances of the parsing module 1134 and indexing module 1136, with each set of instances configured to simultaneously operate on data from the same data source or from different data sources. The parsing module 1134 and indexing module 1136 are illustrated in FIG. 11 to facilitate discussion, with the understanding that implementations with other components are possible to achieve the same functionality.

The parsing module 1134 determines information about incoming event data, where the information can be used to identify events within the event data. For example, the parsing module 1134 can associate a source type with the event data. A source type identifies the data source 1102 and describes a possible data structure of event data produced by the data source 1102. For example, the source type can indicate which fields to expect in events generated at the data source 1102 and the keys for the values in the fields, and possibly other information such as sizes of fields, an order of the fields, a field separator, and so on. The source type of the data source 1102 can be specified when the data source 1102 is configured as a source of event data. Alternatively, the parsing module 1134 can determine the source type from the event data, for example from an event field in the event data or using machine learning techniques applied to the event data.

Other information that the parsing module 1134 can determine includes timestamps. In some cases, an event includes a timestamp as a field, and the timestamp indicates a point in time when the action represented by the event occurred or was recorded by the data source 1102 as event data. In these cases, the parsing module 1134 may be able to determine from the source type associated with the event data that the timestamps can be extracted from the events themselves. In some cases, an event does not include a timestamp and the parsing module 1134 determines a timestamp for the event, for example from a name associated with the event data from the data source 1102 (e.g., a file name when the event data is in the form of a file) or a time associated with the event data (e.g., a file modification time). As another example, when the parsing module 1134 is not able to determine a timestamp from the event data, the parsing module 1134 may use the time at which it is indexing the event data. As another example, the parsing module 1134 can use a user-configured rule to determine the timestamps to associate with events.

The parsing module 1134 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1134 may be able to determine event boundaries from the source type associated with the event data, for example from a data structure indicated by the source type.

In some implementations, a user can configure rules the parsing module 1134 can use to identify event boundaries.

The parsing module 1134 can further extract data from events and possibly also perform transformations on the events. For example, the parsing module 1134 can extract a set of fields (key-value pairs) for each event, such as a host or hostname, source or source name, and/or source type. The parsing module 1134 may extract certain fields by default or based on a user configuration. Alternatively or additionally, the parsing module 1134 may add fields to events, such as a source type or a user-configured field. As another example of a transformation, the parsing module 1134 can anonymize fields in events to mask sensitive information, such as social security numbers or account numbers. Anonymizing fields can include changing or replacing values of specific fields. The parsing component 1134 can further perform user-configured transformations.

The parsing module 1134 outputs the results of processing incoming event data to the indexing module 1136, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1132 can be configured to identify searchable segments that are parts of fields, searchable segments that are entire fields, or both. The parsing module 1134 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1146, to find event data that matches a search query. In some implementations, segmentation can alternatively be performed by the forwarder 1126. Segmentation can also be disabled, in which case the indexer 1132 will not build a lexicon for the event data. When segmentation is disabled, the search system searches the event data directly.

Building index data structures generates the index 1138. The index 1138 is a storage data structure on a storage device (e.g., a disk drive or other physical device for storing digital data). The storage device may be a component of the computing device on which the indexer 1132 is operating (referred to herein as local storage) or may be a component of a different computing device (referred to herein as remote storage) that the indexer 1138 has access to over a network. The indexer 1132 can manage more than one index and can manage indexes of different types. For example, the indexer 1132 can manage event indexes, which impose minimal structure on stored data and can accommodate any type of data. As another example, the indexer 1132 can manage metrics indexes, which use a highly structured format to handle the higher volume and lower latency demands associated with metrics data.

The indexing module 1136 organizes files in the index 1138 in directories referred to as buckets. The files in a bucket 1144 can include raw data files, index files, and possibly also other metadata files. As used herein, "raw data" means data as when the data was produced by the data source 1102, without alteration to the format or content. As noted previously, the parsing component 1134 may add fields to event data and/or perform transformations on fields in the event data. Event data that has been altered in this way is referred to herein as enriched data. A raw data file 1148 can include enriched data, in addition to or instead of raw data. The raw data file 1148 may be compressed to reduce disk usage. An index file 1146, which may also be referred to herein as a "time-series index" or tsidx file, contains metadata that the indexer 1132 can use to search a corresponding raw data file 1148. As noted above, the metadata in the index file 1146 includes a lexicon of the event data, which associates each unique keyword in the event data with a reference to the location of event data within the raw data file 1148. The keyword data in the index file 1146 may also be referred to as an inverted index. In various implementations, the data intake and query system can use index files for other purposes, such as to store data summarizations that can be used to accelerate searches.

A bucket 1144 includes event data for a particular range of time. The indexing module 1136 arranges buckets in the index 1138 according to the age of the buckets, such that buckets for more recent ranges of time are stored in short-term storage 1140 and buckets for less recent ranges of time are stored in long-term storage 1142. Short-term storage 1140 may be faster to access while long-term storage 1142 may be slower to access. Buckets may be moves from short-term storage 1140 to long-term storage 1142 according to a configurable data retention policy, which can indicate at what point in time a bucket is old enough to be moved.

A bucket's location in short-term storage 1140 or long-term storage 1142 can also be indicated by the bucket's status. As an example, a bucket's status can be "hot," "warm," "cold," "frozen," or "thawed." In this example, hot bucket is one to which the indexer 1132 is writing data and the bucket becomes a warm bucket when the index 1132 stops writing data to it. In this example, both hot and warm buckets reside in short-term storage 1140. Continuing this example, when a warm bucket is moved to long-term storage 1142, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1120 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1120 through the monitoring console 1116 provided by the user interface system 1114. Using the monitoring console 1116, the user can configure and monitor an index cluster, and see information such as disk usage by an index, volume usage by an indexer, index and volume size over time, data age, statistics for bucket types, and bucket settings, among other information.

Figure 12:
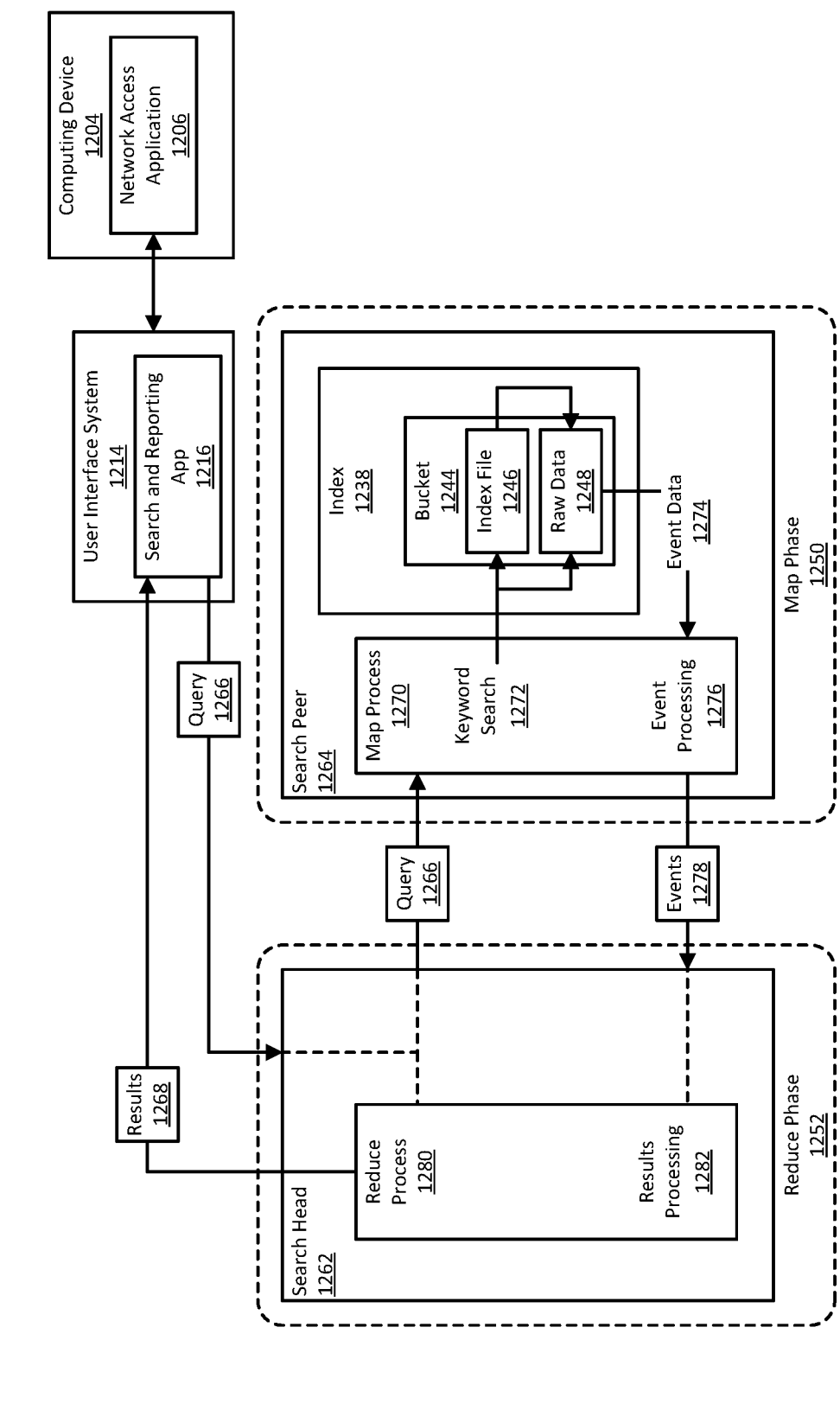
FIG. 12 is a block diagram illustrating in greater detail an example of the search system of a data intake and query system, such as the data intake and query system of FIG. 10.

FIG. 12 is a block diagram illustrating in greater detail an example of the search system 1260 of a data intake and query system, such as the data intake and query system 1010 of FIG. 10. The search system 1260 of FIG. 12 issues a query 1266 to a search head 1262, which sends the query 1266 to a search peer 1264. Using a map process 1270, the search peer 1264 searches the appropriate index 1238 for events identified by the query 1266 and sends events 1278 so identified back to the search head 1262. Using a reduce process 1282, the search head 1262 processes the events 1278 and produces results 1268 to respond to the query 1266. The results 1268 can provide useful insights about the data stored in the index 1238. These insights can aid in the administration of information technology systems, in security analysis of information technology systems, and/or in analysis of the development environment provided by information technology systems.

The query 1266 that initiates a search is produced by a search and reporting app 1216 that is available through the user interface system 1214 of the data intake and query system. Using a network access application 1206 executing on a computing device 1204, a user can input the query 1266 into a search field provided by the search and reporting app 1216. Alternatively or additionally, the search and reporting app 1216 can include pre-configured queries or stored queries that can be activated by the user. In some cases, the search and reporting app 1216 initiates the query 1266 when the user enters the query 1266. In these cases, the query 1266 maybe referred to as an "ad-hoc" query. In some cases, the search and reporting app 1216 initiates the query 1266 based on a schedule. For example, the search and reporting app 1216 can be configured to execute the query 1266 once per hour, once per day, at a specific time, on a specific date, or at some other time that can be specified by a date, time, and/or frequency. These types of queries maybe referred to as scheduled queries.

The query 1266 is specified using a search processing language. The search processing language includes commands or search terms that the search peer 1264 will use to identify events to return in the search results 1268. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1266 to include sequential commands, where a subsequent command may operate on the results of a prior command. As an example, sequential commands may be separated in the query 1266 by a vertical line ("|" or "pipe") symbol.

In addition to one or more search commands, the query 1266 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1266 occurs in two broad phases: a map phase 1250 and a reduce phase 1252. The map phase 1250 takes place across one or more search peers. In the map phase 1250, the search peers locate event data that matches the search terms in the search query 1266 and sorts the event data into field-value pairs. When the map phase 1250 is complete, the search peers send events that they have found to one or more search heads for the reduce phase 1252. During the reduce phase 1252, the search heads process the events through commands in the search query 1266 and aggregate the events to produce the final search results 1268.

A search head, such as the search head 1262 illustrated in FIG. 12, is a component of the search system 1260 that manages searches. The search head 1262, which may also be referred to herein as a search management component, can be implemented using program code that can be executed on a computing device. The program code for the search head 1262 can be stored on a non-transitory computer-readable medium and from this medium can be loaded or copied to the memory of a computing device. One or more hardware processors of the computing device can read the program code from the memory and execute the program code in order to implement the operations of the search head 1262.

Upon receiving the search query 1266, the search head 1262 directs the query 1266 to one or more search peers, such as the search peer 1264 illustrated in FIG. 12. "Search peer" is an alternate name for "indexer" and a search peer may be largely similar to the indexer described previously. The search peer 1264 may be referred to as a "peer node" when the search peer 1264 is part of an indexer cluster. The search peer 1264, which may also be referred to as a search execution component, can be implemented using program code that can be executed on a computing device. In some implementations, one set of program code implements both the search head 1262 and the search peer 1264 such that the search head 1262 and the search peer 1264 form one component. In some implementations, the search head 1262 is an independent piece of code that performs searching and no indexing functionality. In these implementations, the search head 1262 may be referred to as a dedicated search head.

The search head 1262 may consider multiple criteria when determining whether to send the query 1266 to the particular search peer 1264. For example, the search system 1260 may be configured to include multiple search peers that each have duplicative copies of at least some of the event data and are implanted using different hardware resources q. In this example, the sending the search query 1266 to more than one search peer allows the search system 1260 to distribute the search workload across different hardware resources. As another example, search system 1260 may include different search peers for different purposes (e.g., one has an index storing a first type of data or from a first data source while a second has an index storing a second type of data or from a second data source). In this example, the search query 1266 may specify which indexes to search, and the search head 1262 will send the query 1266 to the search peers that have those indexes.

To identify events 1278 to send back to the search head 1262, the search peer 1264 performs a map process 1270 to obtain event data 1274 from the index 1238 that is maintained by the search peer 1264. During a first phase of the map process 1270, the search peer 1264 identifies buckets that have events that are described by the time indicator in the search query 1266. As noted above, a bucket contains events whose timestamps fall within a particular range of time. For each bucket 1244 whose events can be described by the time indicator, during a second phase of the map process 1270, the search peer 1264 performs a keyword search 1274 using search terms specified in the search query #A66. The search terms can be one or more of keywords, phrases, fields, Boolean expressions, and/or comparison expressions that in combination describe events being searched for. When segmentation is enabled at index time, the search peer 1264 performs the keyword search 1272 on the bucket's index file 1246. As noted previously, the index file 1246 includes a lexicon of the searchable terms in the events stored in the bucket's raw data 1248 file. The keyword search 1272 searches the lexicon for searchable terms that correspond to one or more of the search terms in the query 1266. As also noted above, the lexicon incudes, for each searchable term, a reference to each location in the raw data 1248 file where the searchable term can be found. Thus, when the keyword search identifies a searchable term in the index file 1246 that matches a search term in the query 1266, the search peer 1264 can use the location references to extract from the raw data 1248 file the event data 1274 for each event that include the searchable term.

In cases where segmentation was disabled at index time, the search peer 1264 performs the keyword search 1272 directly on the raw data 1248 file. To search the raw data 1248, the search peer 1264 may identify searchable segments in events in a similar manner as when the data was indexed. Thus, depending on how the search peer 1264 is configured, the search peer 1264 may look at event fields and/or parts of event fields to determine whether an event matches the query 1266. Any matching events can be added to the event data #A74 read from the raw data 1248 file. The search peer 1264 can further be configured to enable segmentation at search time, so that searching of the index 1238 causes the search peer 1264 to build a lexicon in the index file 1246.

The event data 1274 obtained from the raw data 1248 file includes the full text of each event found by the keyword search 1272. During a third phase of the map process 1270, the search peer 1264 performs event processing 1276 on the event data 1274, with the steps performed being determined by the configuration of the search peer 1264 and/or commands in the search query 1266. For example, the search peer 1264 can be configured to perform field discovery and field extraction. Field discovery is a process by which the search peer 1264 identifies and extracts key-value pairs from the events in the event data 1274. The search peer 1264 can, for example, be configured to automatically extract the first 100 fields (or another number of fields) in the event data 1274 that can be identified as key-value pairs. As another example, the search peer 1264 can extract any fields explicitly mentioned in the search query 1266. The search peer 1264 can, alternatively or additionally, be configured with particular field extractions to perform.

Other examples of steps that can be performed during event processing 1276 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1264 sends processed events 1278 to the search head 1262, which performs a reduce process 1280. The reduce process 1280 potentially receives events from multiple search peers and performs various results processing 1282 steps on the received events. The results processing 1282 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1282 can further include applying commands from the search query 1266 to the events. The query 1266 can include, for example, commands for evaluating and/or manipulating fields (e.g., to generate new fields from existing fields or parse fields that have more than one value). As another example, the query 1266 can include commands for calculating statistics over the events, such as counts of the occurrences of fields, or sums, averages, ranges, and so on, of field values. As another example, the query 1266 can include commands for generating statistical values for purposes of generating charts of graphs of the events.

The reduce process 1280 outputs the events found by the search query 1266, as well as information about the events. The search head 1262 transmits the events and the information about the events as search results 1268, which are received by the search and reporting app 1216. The search and reporting app 1216 can generate visual interfaces for viewing the search results 1268. The search and reporting app 1216 can, for example, output visual interfaces for the network access application 1206 running on a computing device 1204 to generate.

The visual interfaces can include various visualizations of the search results 1268, such as tables, line or area charts, Chloropleth maps, or single values. The search and reporting app 1216 can organize the visualizations into a dashboard, where the dashboard includes a panel for each visualization. A dashboard can thus include, for example, a panel listing the raw event data for the events in the search results 1268, a panel listing fields extracted at index time and/or found through field discovery along with statistics for those fields, and/or a timeline chart indicating how many events occurred at specific points in time (as indicated by the timestamps associated with each event). In various implementations, the search and reporting app 1216 can provide one or more default dashboards. Alternatively or additionally, the search and reporting app 1216 can include functionality that enables a user to configure custom dashboards.

The search and reporting app 1216 can also enable further investigation into the events in the search results 1216. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1266. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 13:
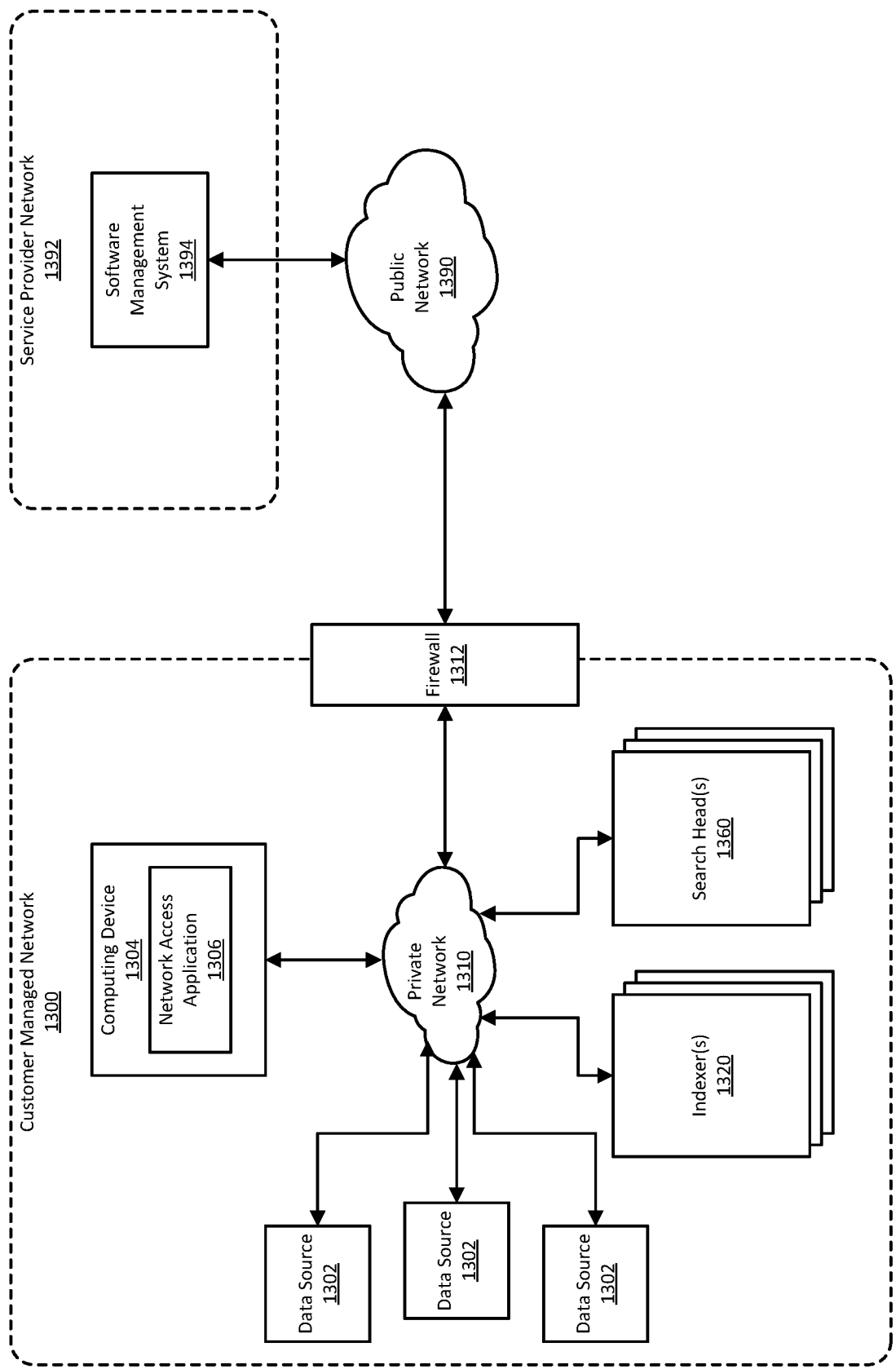
FIG. 13 illustrates an example of a self-managed network 1300 that includes a data intake and query system.

FIG. 13 illustrates an example of a self-managed network 1300 that includes a data intake and query system. "Self-managed" in this instance means that the entity that is operating the self-managed network 1300 configures, administers, maintains, and/or operates the data intake and query system using its own compute resources and people. Further, the self-managed network 1300 of this example is part of the entity's on-premises network and comprises a set of compute, memory, and networking resources that are located, for example, within the confines of an entity's data center. These resources can include software and hardware resources. The entity can, for example, be a company or enterprise, a school, government entity, or other entity. Since the self-managed network 1300 is located within the customer's on-prem environment, such as in the entity's data center, the operation and management of the self-managed network 1300, including of the resources in the self-managed network 1300, is under the control of the entity. For example, administrative personnel of the entity have complete access to and control over the configuration, management, and security of the self-managed network 1300 and its resources.

The self-managed network 1300 can execute one or more instances of the data intake and query system. An instance of the data intake and query system may be executed by one or more computing devices that are part of the self-managed network 1300. A data intake and query system instance can comprise an indexing system and a search system, where the indexing system includes one or more indexers 1320 and the search system includes one or more search heads 1360.

As depicted in FIG. 13, the self-managed network 1300 can include one or more data sources 1302. Data received from these data sources may be processed by an instance of the data intake and query system within self-managed network 1300. The data sources 1302 and the data intake and query system instance can be communicatively coupled to each other via a private network 1310.

Users associated with the entity can interact with and avail themselves of the functions performed by a data intake and query system instance using computing devices. As depicted in FIG. 13, a computing device 1304 can execute a network access application 1306 (e.g., a web browser), that can communicate with the data intake and query system instance and with data sources 1302 via the private network 1310. Using the computing device 1304, a user can perform various operations with respect to the data intake and query system, such as management and administration of the data intake and query system, generation of knowledge objects, and other functions. Results generated from processing performed by the data intake and query system instance may be communicated to the computing device 1304 and output to the user via an output system (e.g., a screen) of the computing device 1304.

The self-managed network 1300 can also be connected to other networks that are outside the entity's on-premises environment/network, such as networks outside the entity's data center. Connectivity to these other external networks is controlled and regulated through one or more layers of security provided by the self-managed network 1300. One or more of these security layers can be implemented using firewalls 1312. The firewalls 1312 form a layer of security around the self-managed network 1300 and regulate the transmission of traffic from the self-managed network 1300 to the other networks and from these other networks to the self-managed network 1300.

Networks external to the self-managed network can include various types of networks including public networks 1390, other private networks, and/or cloud networks provided by one or more cloud service providers. An example of a public network 1390 is the Internet. In the example depicted in FIG. 13, the self-managed network 1300 is connected to a service provider network 1392 provided by a cloud service provider via the public network 1390.

In some implementations, resources provided by a cloud service provider may be used to facilitate the configuration and management of resources within the self-managed network 1300. For example, configuration and management of a data intake and query system instance in the self-managed network 1300 may be facilitated by a software management system 1394 operating in the service provider network 1392.

There are various ways in which the software management system 1394 can facilitate the configuration and management of a data intake and query system instance within the self-managed network 1300. As one example, the software management system 1394 may facilitate the download of software including software updates for the data intake and query system. In this example, the software management system 1394 may store information indicative of the versions of the various data intake and query system instances present in the self-managed network 1300. When a software patch or upgrade is available for an instance, the software management system 1394 may inform the self-managed network 1300 of the patch or upgrade. This can be done via messages communicated from the software management system 1394 to the self-managed network 1300.

The software management system 1394 may also provide simplified ways for the patches and/or upgrades to be downloaded and applied to the self-managed network 1300. For example, a message communicated from the software management system 1394 to the self-managed network 1300 regarding a software upgrade may include a Uniform Resource Identifier (URI) that can be used by a system administrator of the self-managed network 1300 to download the upgrade to the self-managed network 1300. In this manner, management resources provided by a cloud service provider using the service provider network 1392 and which are located outside the self-managed network 1300 can be used to facilitate the configuration and management of one or more resources within the entity's on-prem environment. In some implementations, the download of the upgrades and patches may be automated, whereby the software management system 1394 is authorized to, upon determining that a patch is applicable to a data intake and query system instance inside the self-managed network 1300, automatically communicate the upgrade or patch to self-managed network 1300 and cause it to be installed within self-managed network 1300.

1. In various embodiments, a computer-implemented method comprises receiving a first request to display a dashboard associated with a dashboard definition including an embedded search query, wherein a first token is associated with the embedded search query, transmitting a second request to execute the embedded search query on a dataset generated by a data source, receiving, in real-time, a first set of field values in response to the embedded search query being at least partially executed on the dataset, determining, based on a first token, at least one field value in the first set of field values to be displayed, and generating for display a first dashboard visualization corresponding to the dashboard and including the at least one field value, wherein the at least one field value is positioned within the first dashboard visualization at a location corresponding to the first token.

2. The computer-implemented method of clause 1, further comprising identifying, by an event handler from a client device, a first set of data associated with the second request, and determining a first status based on a first portion of data in the first set of data, wherein the first portion of data is associated with the embedded search query executing on the dataset.

3. The computer-implemented method of clause 1 or 2, where a second token is associated with the embedded search query being at least partially executed on the dataset, and further comprising updating, by a token management system, the second token to correspond to the first status.

4. The computer-implemented method of any of clauses 1-3, further comprising identifying, from the dashboard definition, a set of two or more tokens that include the first textual token, and adding the set of two or more tokens to a queue.

5. The computer-implemented method of any of clauses 1-4, where a second token is associated with the embedded search query being at least partially executed on the dataset, a first event handler of a first type identifies the first token, and a second event handler of a second type identifies the second token.

6. The computer-implemented method of any of clauses 1-5, further comprising generating for display a first dashboard visualization, receiving, in real-time, a second set of field values in response to the embedded search query being further executed on the dataset, determining, based on the first token, at least one field value in the second set of field values to be displayed, and updating the first dashboard visualization to include the at least one field value in the second set of field values, wherein the at least one field value in the second set of field values is positioned within the first dashboard visualization at the location corresponding to the first token.

7. The computer-implemented method of any of clauses 1-6, further comprising prior to generating for display a first dashboard visualization, comparing a first metadata value, corresponding a second token, to a predefined condition, wherein the second token is associated with the execution of the embedded search query, removing the first dashboard visualization when the first metadata value does not satisfy the predefined condition, and displaying the first dashboard visualization when the first metadata value satisfies the predefined condition.

8. The computer-implemented method of any of clauses 1-7, where the predefined condition is associated with at least one of a status of the execution of the embedded search query, a quantity of search results, and a quantity of messages generated by the execution of the embedded search query.

9. The computer-implemented method of any of clauses 1-8, further comprising identifying, by an event handler, data associated with the second request, adding, based on the data, the first token to a search event queue, retrieving, by a queue manager, the first textual token from the search event queue, and setting the first token to correspond to a first field, wherein the at least one field value is a value for the first field.

10. The computer-implemented method of any of clauses 1-9, where the first token includes a unique identifier for the data source.

11. In various embodiments a computing device, comprises a processor, and a non-transitory computer-readable medium having stored thereon instructions that, when executed by the processor, cause the processor to perform operations including receiving a first request to display a dashboard associated with a dashboard definition including an embedded search query, wherein a first token is associated with the embedded search query, transmitting a second request to execute the embedded search query on a dataset generated by a data source, receiving, in real-time, a first set of field values in response to the embedded search query being at least partially executed on the dataset, determining, based on a first token, at least one field value in the first set of field values to be displayed, and generating for display a first dashboard visualization corresponding to the dashboard and including the at least one field value, wherein the at least one field value is positioned within the first dashboard visualization at a location corresponding to the first token.

12. The computing device of clause 11, where operations further include prior to generating for display a first dashboard visualization, comparing a first metadata value, corresponding a second token, to a predefined condition, wherein the second token is associated with the execution of the embedded search query, displaying a first dashboard visualization type when the first metadata value does not satisfy the predefined condition, and displaying a second dashboard visualization type when the first metadata value satisfies the predefined condition.

13. The computing device of clause 11 or 12, where the dashboard definition includes a first set of tokens, each corresponding to a field retrieved by the execution of the embedded search query, and a second set of tokens, each corresponding to a portion of metadata associated with the execution of the embedded search query.

14. The computing device of any of clauses 11-13, where the operations further include identifying, by an event handler from a client device, a first set of data associated with the second request, and determining a first status based on a first portion of data in the first set of data, wherein the first portion of data is associated with the embedded search query executing on the dataset.

15. The computing device of any of clauses 11-14, where the operations further include generating for display a first dashboard visualization, receiving in real-time, a second set of field values in response to the embedded search query being further executed on the dataset, determining, based on the first token, at least one field value in the second set of field values to be displayed, and updating the first dashboard visualization to include the at least one field value in the second set of field values, where the at least one field value in the second set of field values is positioned within the first dashboard visualization at the location corresponding to the first token.

16. The computing device of any of clauses 11-15, where the operations further include identifying, by an event handler, data associated with the second request, adding, based on the data, the first token to a search event queue, retrieving, by a queue manager, the first textual token from the search event queue, and setting the first token to correspond to a first field, wherein the at least one field value is a value for the first field.

17. In various embodiments, a non-transitory computer-readable medium having stored thereon instructions that, when executed by one or more processors, cause the one or more processors to perform operations including receiving a first request to display a dashboard associated with a dashboard definition, wherein the dashboard definition includes a first textual token having an embedded search query, transmitting a second request to execute the embedded search query on a data source, receiving, in real-time, a first set of field values in response to the embedded search query being at least partially executed on the data source, determining, based on a first textual token, at least one field value in the first set of field values to be displayed, and generating for display a first dashboard visualization corresponding to the dashboard and including the at least one field value, wherein the at least one field value is positioned within the first dashboard visualization at a location corresponding to the first textual token.

18. The non-transitory computer-readable medium of clause 17, where the operations further include identifying, by an event handler from a client device, a first set of data associated with the second request, and determining a first status based on a first portion of data in the first set of data, wherein the first portion of data is associated with the embedded search query executing on the dataset.

19. The non-transitory computer-readable medium of clause 17 or 18, where the operations further include identifying, by an event handler, data associated with the second request, adding, based on the data, the first token to a search event queue, retrieving, by a queue manager, the first textual token from the search event queue, and setting the first token to correspond to a first field, wherein the at least one field value is a value for the first field.

20. The non-transitory computer-readable medium of any of clauses 17-19, where the operations further include identifying, from the dashboard definition, a set of two or more tokens that include the first textual token, and adding the set of two or more tokens to a queue.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   receiving a first request to display a dashboard associated with a dashboard definition including an embedded search query, wherein a first token is associated with the embedded search query;
   transmitting a second request to execute the embedded search query on a dataset generated by a data source;
   receiving, in real-time, a first set of field values in response to the embedded search query being at least partially executed on the dataset;
   determining, based on the first token, at least one field value in the first set of field values to be displayed, wherein the first token is set with a value corresponding to the at least one field value; and
   generating for display a first dashboard visualization corresponding to the dashboard and including the value, wherein the value replaces the first token within the first dashboard visualization at a location corresponding to the first token.

2. The computer-implemented method of claim 1, further comprising:
   identifying, by an event handler from a client device, a first set of data associated with the second request; and
   determining a first status based on a first portion of data in the first set of data,
      wherein the first portion of data is associated with the embedded search query executing on the dataset.

3. The computer-implemented method of claim 2, wherein a second token is associated with the embedded search query being at least partially executed on the dataset, and further comprising updating, by a token management system, the second token to correspond to the first status.

4. The computer-implemented method of claim 1, further comprising:
   identifying, from the dashboard definition, a set of two or more tokens that include the first token; and
   adding the set of two or more tokens to a queue.

5. The computer-implemented method of claim 1, wherein:
   a second token is associated with the embedded search query being at least partially executed on the dataset,
   a first event handler of a first type identifies the first token, and
   a second event handler of a second type identifies the second token.

6. The computer-implemented method of claim 1, further comprising:
   generating for display a first dashboard visualization;
   receiving, in real-time, a second set of field values in response to the embedded search query being further executed on the dataset;
   determining, based on the first token, at least one field value in the second set of field values to be displayed, wherein the first token is set with a second value corresponding to the at least one field value; and
   updating the first dashboard visualization to include the second value, second value replaces the first token within the first dashboard visualization at the location corresponding to the first token.

7. The computer-implemented method of claim 1, further comprising:
   prior to generating for display a first dashboard visualization, comparing a first metadata value, corresponding a second token, to a predefined condition,
      wherein the second token is associated with the execution of the embedded search query;
   removing the first dashboard visualization when the first metadata value does not satisfy the predefined condition; and
   displaying the first dashboard visualization when the first metadata value satisfies the predefined condition.

8. The computer-implemented method of claim 7, wherein the predefined condition is associated with at least one of:
   a status of the execution of the embedded search query;
   a quantity of search results; and
   a quantity of messages generated by the execution of the embedded search query.

9. The computer-implemented method of claim 1, further comprising:
   identifying, by an event handler, data associated with the second request;
   adding, based on the data, the first token to a search event queue;
   retrieving, by a queue manager, the first token from the search event queue; and
   setting the first token to correspond to a first field, wherein the at least one field value is a value for the first field.

10. The computer-implemented method of claim 1, wherein the first token includes a unique identifier for the data source.

11. A computing device, comprising:
   a processor; and
   a non-transitory computer-readable medium having stored thereon instructions that, when executed by the processor, cause the processor to perform operations including:
      receiving a first request to display a dashboard associated with a dashboard definition including an embedded search query, wherein
      a first token is associated with the embedded search query;
      transmitting a second request to execute the embedded search query on a dataset generated by a data source;

receiving, in real-time, a first set of field values in response to the embedded search query being at least partially executed on the dataset;

determining, based on the first token, at least one field value in the first set of field values to be displayed, wherein the first token is set with a value corresponding to the at least one field value; and generating for display a first dashboard visualization corresponding to the dashboard and including the value, wherein the value replaces the first token within the first dashboard visualization at a location corresponding to the first token.

12. The computing device of claim 11, wherein operations further include:

prior to generating for display a first dashboard visualization, comparing a first metadata value, corresponding a second token, to a predefined condition, wherein the second token is associated with the execution of the embedded search query;

displaying a first dashboard visualization type when the first metadata value does not satisfy the predefined condition; and displaying a second dashboard visualization type when the first metadata value satisfies the predefined condition.

13. The computing device of claim 11, wherein the dashboard definition includes:

a first set of tokens, each corresponding to a field retrieved by the execution of the embedded search query; and a second set of tokens, each corresponding to a portion of metadata associated with the execution of the embedded search query.

14. The computing device of claim 11, wherein the operations further include:

identifying, by an event handler from a client device, a first set of data associated with the second request; and determining a first status based on a first portion of data in the first set of data, wherein the first portion of data is associated with the embedded search query executing on the dataset.

15. The computing device of claim 11, wherein the operations further include:

generating for display a first dashboard visualization;

receiving in real-time, a second set of field values in response to the embedded search query being further executed on the dataset;

determining, based on the first token, at least one field value in the second set of field values to be displayed, wherein the first token is set with a second value corresponding to the at least one field value; and updating the first dashboard visualization to include the second value, second value replaces the first token within the first dashboard visualization at the location corresponding to the first token.

16. The computing device of claim 11, wherein the operations further include:

identifying, by an event handler, data associated with the second request;

adding, based on the data, the first token to a search event queue;

retrieving, by a queue manager, the first token from the search event queue; and setting the first token to correspond to a first field, wherein the at least one field value is a value for the first field.

17. One or more non-transitory computer-readable media having stored thereon instructions that, when executed by one or more processors, cause the one or more processors to perform operations including:

receiving a first request to display a dashboard associated with a dashboard definition, wherein the dashboard definition includes a first token having an embedded search query;

transmitting a second request to execute the embedded search query on a dataset;

receiving, in real-time, a first set of field values in response to the embedded search query being at least partially executed on the dataset;

determining, based on the first token, at least one field value in the first set of field values to be displayed, wherein the first token is set with a value corresponding to the at least one field value; and generating for display a first dashboard visualization corresponding to the dashboard and including the value, wherein the value replaces the first token within the first dashboard visualization at a location corresponding to the first token.

18. The one or more non-transitory computer-readable media of claim 17, wherein the operations further include:

identifying, by an event handler from a client device, a first set of data associated with the second request; and determining a first status based on a first portion of data in the first set of data, wherein the first portion of data is associated with the embedded search query executing on the dataset.

19. The one or more non-transitory computer-readable media of claim 17, wherein the operations further include:

identifying, by an event handler, data associated with the second request;

adding, based on the data, the first token to a search event queue;

retrieving, by a queue manager, the first token from the search event queue; and setting the first token to correspond to a first field, wherein the at least one field value is a value for the first field.

20. The one or more non-transitory computer-readable media of claim 17, wherein the operations further include:

identifying, from the dashboard definition, a set of two or more tokens that include the first token; and adding the set of two or more tokens to a queue.

* * * * *